United States Patent
Linnen et al.

(10) Patent No.: US 12,061,542 B2
(45) Date of Patent: Aug. 13, 2024

(54) MEMORY DEVICE WITH LATCH-BASED NEURAL NETWORK WEIGHT PARITY DETECTION AND TRIMMING

(71) Applicant: Western Digital Technologies, Inc., San Jose, CA (US)

(72) Inventors: Daniel Joseph Linnen, Naperville, IL (US); Ramanathan Muthiah, Bangalore (IN); Kirubakaran Periyannan, Saratoga, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/847,089

(22) Filed: Jun. 22, 2022

(65) Prior Publication Data

US 2023/0418738 A1    Dec. 28, 2023

(51) Int. Cl.
  *G06F 12/02*  (2006.01)
  *G06F 3/06*  (2006.01)
  (Continued)

(52) U.S. Cl.
  CPC ........ *G06F 12/0246* (2013.01); *G06F 3/0616* (2013.01); *G06F 3/0658* (2013.01);
  (Continued)

(58) Field of Classification Search
  None
  See application file for complete search history.

(56) References Cited

U.S. PATENT DOCUMENTS 5,050,095 A    9/1991   Samad
6,378,108 B1*  4/2002   Schoellkopf .......... H04L 1/0063
                                                714/800
(Continued)

FOREIGN PATENT DOCUMENTS

CN    113516172 A    10/2021

OTHER PUBLICATIONS

Kim, Minsu, "Non-Volatile Neuromorphic Computing based on Logic-Compatible Embedded Flash Memory Technology", University of Minnesota's Digital Conservancy; Jul. 2020; https://conservancy.umn.edu/handle/11299/216877; 3 pages.
(Continued)

*Primary Examiner* — Stephanie Wu
(74) *Attorney, Agent, or Firm* — LOZA & LOZA, LLP; Gabriel Fitch

(57) ABSTRACT

Latch-based methods and apparatus for performing neural network weight parity detection on the die of a non-volatile memory (NVM) array to detect bit flip errors within neural network weight data are described, particularly for use with floating point number values. Upon detection of a parity error in a neural network weight, the erroneous weight is set to zero to trim the corresponding neuron from the network, thus preventing the erroneous value from significantly affecting the network, particularly in situations where the bit flip would otherwise affect the magnitude of a floating-point weight value. The exemplary latch-based procedures described herein are linear procedures that do not require logic decisions. Procedures are also described that assess an amount of degradation in the NVM array based on parity bit data collected in the latches. Multiple plane and multiple die NVM array implementations are also described for massive parallel processing.

28 Claims, 11 Drawing Sheets

(51) Int. Cl.
    *G06N 3/02* (2006.01)
    *G06N 3/063* (2023.01)
    *G06N 3/10* (2006.01)
(52) U.S. Cl.
    CPC ............. *G06F 3/0688* (2013.01); *G06N 3/02* (2013.01); *G06N 3/063* (2013.01); *G06N 3/10* (2013.01); *G06F 2212/1036* (2013.01)

(56) References Cited

U.S. PATENT DOCUMENTS

| | | | |
|---|---|---|---|
| 7,313,550 | B2 | 12/2007 | Kulkarni et al. |
| 8,345,295 | B2 | 1/2013 | Kim |
| 9,239,691 | B2 | 1/2016 | Lam |
| 9,336,483 | B1 | 5/2016 | Abeysooriya et al. |
| 9,875,440 | B1 | 1/2018 | Commons |
| 10,180,820 | B2 | 1/2019 | Buchanan et al. |
| 10,356,320 | B2 | 7/2019 | Shirota et al. |
| 10,552,936 | B2 | 2/2020 | Li |
| 11,064,194 | B2 | 7/2021 | Muthiah |
| 2011/0222735 | A1 | 9/2011 | Imai et al. |
| 2019/0147327 | A1* | 5/2019 | Martin ................ G06N 3/063 706/15 |
| 2019/0311267 | A1 | 10/2019 | Qin et al. |
| 2020/0097807 | A1 | 3/2020 | Knag et al. |
| 2020/0117539 | A1 | 4/2020 | Sun et al. |
| 2020/0134443 | A1* | 4/2020 | Qin ...................... G06N 3/10 |
| 2020/0184335 | A1 | 6/2020 | Rom et al. |
| 2020/0234103 | A1* | 7/2020 | Luo ...................... G06N 3/047 |
| 2021/0096751 | A1 | 4/2021 | Berman et al. |
| 2021/0110244 | A1 | 4/2021 | Hoang et al. |
| 2021/0304009 | A1 | 9/2021 | Bazarsky et al. |
| 2021/0312959 | A1 | 10/2021 | Shan et al. |
| 2023/0128916 | A1* | 4/2023 | Srikanth ................ G06N 3/08 714/704 |

OTHER PUBLICATIONS

Lee, Sung-Tae et al., "Neuromorphic Computing Using NAND Flash Memory Architecture With Pulse Width Modulation Scheme", Frontiers in Neuroscience: Neuromorphic Engineering; Sep. 18, 2020; https://www.frontiersin.org/articles/10.3389/fnins.2020.571292; 9 pages.

Shim, Wonbo et al., "Architectural Design of 3D NAND Flash based Compute-in-Memory for Inference Engine", MEMSYS 2020: The International Symposium on Memory Systems; Sep. 2020; https://dl.acm.org/doi/10.1145/3422575.3422779; 3 pages.

Wang, Yin et al., "An in-memory computing architecture based on two-dimensional semiconductors for multiply-accumulate operations", Nature Communications; Jun. 7, 2021; https://www.nature.com/articles/s41467-021-23719-3; 28 pages.

Amirsoleimani, Amirali et al., "In-Memory Vector-Matrix Multiplication in Monolithic Complementary Metal-Oxide-Semiconductor-Memristor Integrated Circuits: Design Choices, Challenges, and Perspectives", Advanced Intelligent Systems; vol. 2, Issue 11; Aug. 23, 2020; https://onlinelibrary.wiley.com/doi/full/10.1002/aisy.202000115; 48 pages.

Haj-Ali, Ameer et al., "IMAGING: In-Memory AlGorithms for Image processiNG", IEEE Transactions on Circuits and Systems I: Regular Papers; vol. 65, Issue 12; Dec. 2018; https://ieeexplore.ieee.org/document/8398398; 14 pages.

Zhang, Jintao et al., "In-Memory Computation of a Machine-Learning Classifier in a Standard 6T SRAM Array", IEEE Journal of Solid-State Circuits; vol. 52, Issue 4; Apr. 2017; https://ieeexplore.ieee.org/abstract/document/7875410; 10 pages.

"An On-device Deep Neural Network for Face Detection", Apple Machine Learning Research; Nov. 2017; https://machinelearning.apple.com/research/face-detection; 10 pages.

Kim, Sung et al., "MATIC: Learning Around Errors for Efficient Low-Voltage Neural Network Accelerators", 2018 Design, Automation & Test in Europe Conference & Exhibition; Mar. 19-23, 2018; https://ieeexplore.ieee.org/document/8341970; 6 pages.

Tsai, Li-Huang et al., "Robust Processing-In-Memory Neural Networks via Noise-Aware Normalization", Nov. 24, 2020; https://arxiv.org/pdf/2007.03230.pdf; 7 pages.

He, Ruiquan et al., "Artificial Neural Network Assisted Error Correction for MLC NAND Flash Memory", Aug. 2021; https://www.ncbi.nlm.nih.gov/pmc/articles/PMC8398337; 19 pages.

Sraw, Jashanpreet Singh et al., "Using Convolutional Neural Networks for fault analysis and alleviation in accelerator systems", Dec. 5, 2021; https://arxiv.org/abs/2112.02657; 8 pages.

Ozen, Elbruz et al., "Low-Cost Error Detection in Deep Neural Network Accelerators with Linear Algorithmic Checksums", Journal of Electronic Testing; Jan. 6, 2021; https://link.springer.com/article/10.1007/s10836-020-05920-2; 16 pages.

Wang, Chen et al., "Neural network based silent error detector", 2018 IEEE International Conference on Cluster Computing; Sep. 10-13, 2018; https://ieeexplore.ieee.org/document/8514878; 10 pages.

Xiao, Patrick T. et al., "Analog architectures for neural network acceleration based on non-volatile memory", Applied Physics Reviews 7; Jul. 9, 2020; 35 pages <https://aip.scitation.org/doi/10.1063/1.5143815>.

Hasan, Mehedi et al., "Reliability of NAND Flash Memory as a Weight Storage Device of Artificial Neural Network", IEEE Transactions on Device and Materials Reliability; vol. 20, Issue 3; Sep. 2020; 8 pages <https://ieeexplore.ieee.org/document/9149916>.

Resch, Salonik et al., "PIMBALL: Binary Neural Networks in Spintronic Memory", ACM Transactions on Architecture and Code Optimization; vol. 16, No. 4, Article 41; Oct. 2019; 26 pages <https://arxiv.org/pdf/1812.03989.pdf>.

Mizushina, Keita et al., "Layer-by-layer Adaptively Optimized ECC of NAND flash-based SSD Storing Convolutional Neural Network Weight for Scene Recognition", 2018 IEEE International Symposium on Circuits and Systems (ISCAS), May 27-30, 2018; 5 pages <https://ieeexplore.ieee.org/abstract/document/8351440>.

* cited by examiner

MEMORY DEVICE WITH LATCH-BASED NEURAL NETWORK WEIGHT PARITY DETECTION AND TRIMMING

FIELD

The disclosure relates, in some aspects, to memory devices such as non-volatile memory (NVM) arrays. More specifically, but not exclusively, the disclosure relates to in-memory neural network weight parity detection and trimming within a die of an NVM array.

INTRODUCTION

Deep learning (which also may be referred to as deep structured learning or hierarchical learning) relates to machine learning methods based on learning data representations or architectures, such as deep neural networks (DNNs), rather than to task-specific procedures or algorithms. Deep learning is applied to such fields as speech recognition, computer vision, and self-driving vehicles. Deep learning may be accomplished by, or facilitated by, deep learning accelerators (DLAs), e.g., microprocessor devices designed to accelerate the generation of useful neural networks to implement deep learning.

The processing of DNNs or other neural networks (NNs) may involve storing neural network weights as floating-point numbers within a non-volatile memory (NVM) such as within a flash NAND memory die. Issues can arise due to bit flips within the stored neural network weights. For example, depending upon the location of the bit flip within the floating-point number, a single bit flip error can greatly affect the order of magnitude of the neural network weight, which can interfere with the processing of the neural network. It would be desirable to provide efficient mechanisms to address such issues, particularly for implementing on an NVM die that includes a set of latches for bit manipulation and temporary storage.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a device that includes: a non-volatile memory (NVM) array formed on a die; a plurality of latches formed on the die; and processing circuitry formed on the die and configured to read a neural network weight from the NVM array into at least one latch of the plurality of latches, and perform a linear sequence of operations using the plurality of latches to (a) set the neural network weight to zero if there is a parity error in the neural network weight and (b) leave the neural network weight unchanged otherwise.

Another embodiment of the disclosure provides a method for use with a device comprising an NVM array formed on a die. The method includes: reading a neural network weight from the NVM array into at least one latch of a plurality of latches on the die; and performing a linear sequence of operations using the plurality of latches to set the neural network weight to zero if there is a parity error in the neural network weight while leaving the neural network weight unchanged otherwise.

Yet another embodiment of the disclosure provides a device that includes: a memory formed on a die; a plurality of latches formed on the die; and processing circuitry formed on the die and configured to read parity-encoded data from the memory into at least one latch of the plurality of latches, and perform a linear sequence of operations using the plurality of latches to set the data to zero if there is a parity error in the data while leaving the data unchanged otherwise.

Still yet another embodiment of the disclosure provides an apparatus for use with a device comprising an NVM array formed on a die. The apparatus includes: means for reading a neural network weight from the NVM array into at least one latch of a plurality of latches on the die; and means for performing a linear sequence of operations using the plurality of latches to set the neural network weight to zero if there is a parity error in the neural network weight while leaving the neural network weight unchanged otherwise.

DETAILED DESCRIPTION

Figure 1:
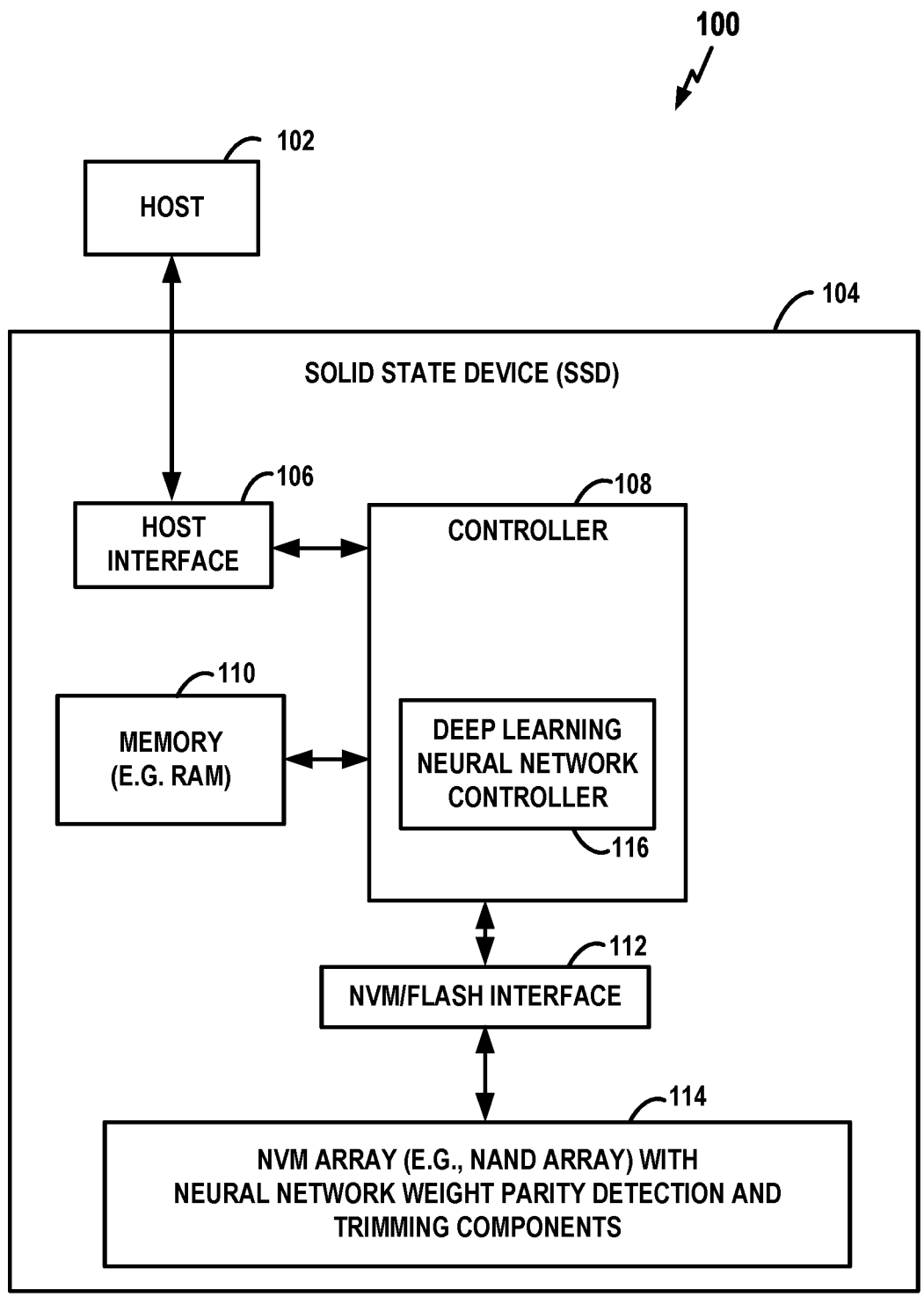
FIG. 1 is a schematic block diagram configuration for an exemplary solid state device (SSD) having one or more non-volatile memory (NVM) array dies, where the dies have neural network weight parity detection and trimming components, according to aspects of the present disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a data storage device (such as an SSD), and in particular to NAND flash memory storage devices (herein "NANDs"). (A NAND is a type of non-volatile storage technology that does not require power to retain data. It exploits negative-AND, i.e., NAND, logic.) For the sake of brevity, an SSD having one or more NAND dies will be used below in the description of various embodiments. It is understood that at least some aspects described herein may be applicable to other forms of data storage devices as well. For example, at least some aspects described herein may be applicable to phase-change memory (PCM) arrays, magneto-resistive random access memory (MRAM) arrays and resistive random access memory (ReRAM) arrays, at least if such devices are equipped with suitable latches for implementing operations discussed herein. In addition to data storage devices, the NVM arrays and associated circuitry and latches in various described embodiments may be implemented as part of memory devices such as dual in-line memory modules (DIMMs) or other types of memory components/modules in some embodiments. Such memory devices may be accessible to a processing component such as a Central Processing Unit (CPU) or a Graphical Processing Unit (GPU). The links between processing components to such memory devices may be provided via one or more memory or system buses, including via interconnects such as Compute Express Link (CXL), Gen-Z, OpenCAPI, NVLink/NVSwitch, Infinity Fabric, Omni-Path and other similar interconnect protocols. In other embodiments, the links between processing components to memory devices may be provided via on-die or die-to-die interconnects. In certain embodiments the NVM arrays and associated circuitry and latches may be co-located on the same die as such processing components such as CPU or GPU.

Overview

As noted above, deep learning may be accomplished by, or facilitated by, deep learning accelerators (DLAs), e.g., microprocessor devices designed to accelerate the generation of deep neural networks (DNNs) to implement deep learning. These networks may also be referred to as learning networks. Issues can arise due to bit flips within the stored neural network weights. In particular, depending upon the location of the bit flip within the floating-point number, a single bit flip error can greatly affect the order of magnitude of the neural network weight, which can interfere with the processing of the neural network.

Herein, methods and apparatus are disclosed for performing neural network weight parity detection on the die of an NVM to detect for bit flip errors within neural network weight floating point numbers. Upon detection of a parity error in a neural network weight, the erroneous value is set to zero so that the erroneous value will not significantly affect the neural network. Note that by setting the neural network weight to zero, the corresponding neuron (i.e., a neural connection between nodes of the network that the neural network weight represents) is trimmed from the neural network. Since a typical neural network may have thousands or millions of neural network weights representing a corresponding number of connections between the nodes in the neural network, the occasional trimming of one of the connections will not likely affect the overall processing of the neural network.

As will be explained, the parity detection and trimming operations may be performed using on-chip latches, thus providing for high-speed in-memory processing. Exemplary procedures described herein can have a linear processing flow, i.e., no decision logic is required. The latch-based operations described herein can be exploited to utilize the massively parallel capability within NAND NVMs for simple bit manipulation to check the parity of the neural network weights and trim the weights that fail the parity check to facilitate in-memory neural network computing. Although neural network operations for use with a DLA of a DNN are used as main examples herein, the latch-based parity detection and trimming described herein are also useful in other in-memory computing systems, such as other types of neural networks, or for processing other types of data.

Note that a DNN is an example of an artificial neural network that has multiple layers between input and output layers. A DNN operates to determine a mathematical computation or manipulation to convert the input into the output, which might be a linear or non-linear computation. For example, the DNN may work through its layers by calculating a probability of each output. Each mathematical manipulation may be considered a layer. Networks that have many layers are referred to as having "deep" layers, hence the term DNN. In one particular example, the DNN might be configured to identify a person within an input image by processing the bits of the input image to identify the person, i.e., the output of the DNN is a value that identifies the particular person.

DNNs are often configured as feedforward networks, in which data flows from an input layer to an output layer in one direction. Initially, the DNN may generate a map of virtual "neurons" and assign initial numerical values or "weights" to connections between the neurons. The weights and inputs are multiplied to return output values between, e.g., 0 and 1. The weights may be adjusted in an attempt to improve the accuracy by which the network relates its input to a known output (to, for example, correctly identified an input image).

In one aspect of a DLA of a DNN, a feedforward computation for a single neuron activation in DNN is given by Equation 1 below, where multiply-accumulate (MAC) operations using synaptic weights are summed and then an activation function is calculated, which is often a maximum function (such as a rectifier linear activation function computed by a rectifier linear unit (RLU or ReLU)) or a sigmoid function. That is, in some examples, the feedforward computation involves a sum over weights (w) multiplied by input values (a) to each neuron in the network plus a bias value (b), the result of which is then applied to a sigmoid activation function ($\sigma$) to yield the next value in the network.

$$a_j^l = \sigma\left(\sum_k w_{jk}^l a_k^{l-1} + b_j^l\right) \quad (1)$$

In Equation 1, $w_{jk}^l$, denotes the weight for a connection from a $k^{th}$ neuron (or node) of the neural network) in an $(l-1)^{th}$ layer of the neural network to a $j^{th}$ neuron in an $l^{th}$ layer. The term $b_j^l$ denotes a bias of the $j^{th}$ neuron in the $l^{th}$ layer and $a_j^l$ denotes the activation of the $j^{th}$ neuron in the $l^{th}$ layer. Thus, the activation $a_j^l$ of the $j^{th}$ neuron in the $l^{th}$ layer is related to the activations in the $(l-1)^{th}$ layer. Note also that in Equation 1 the sum is over all neurons k in the $(l-1)^{th}$ layer. That is, for each layer, the weight w of each of the k neurons in the layer is multiplied by a corresponding activation value for the neuron, the values of this intermediate computation are summed together. This is the aforementioned MAC operation which multiplies individual w and a values and then accumulates (i.e., sums) the results. The appropriate bias value b is then added to the output of the MAC and result is applied to the sigmoid activation function (σ) to obtain the next activation value a. Note also that the zeroth layer of the neural network may be referred to as the input layer, the first layer of the neural network may be referred to as the first hidden layer, and the final layer of the neural network may be referred to as the output layer.

DLA learning schemes may be based on solving backpropagation equations to update the network weights (w). Exemplary backpropagation equations are based on weighted sums using calculated δ terms (in the equations below in a matrix and vector form) for the output and so-called hidden layer neurons in the DNN (i.e., the intermediate layers between the input layer and the output layer) and wherein training values are employed.

Briefly, a cost function C may be defined:

$$C = \frac{1}{2n} \sum_x \|y(x) - a^L(x)\|^2 \quad (2)$$

where n is a total number of training examples x, the sum is over individual training examples, x: y=y(x) is a corresponding desired output (e.g., a known output); L denotes the number of layers in the network; and $a^L=a^L(x)$ is a vector of activations output from the neural network when x is input.

Error values S may be defined based on the cost function and a weighted input values Z:

$$\delta_j^l = \frac{\partial C}{\partial z_j^l}. \quad (3)$$

where $\delta_j^l$ is the error of a neuron j in a layer l and where $z_j^l$ is a weighted input for the neuron j in the layer l. It is noted that the error $\delta_j^l$ is equal to a rate of change of C relative to the bias value b for the jth neuron of the lth layer, e.g.:

$$\frac{\partial C}{\partial b} = \delta \quad (4)$$

where δ is evaluated at the same neuron as the bias b.

Four main backpropagation equations may then be defined:

$$\delta^L = \nabla_a C \odot \sigma'(z^L). \quad (5)$$

$$\delta^l = ((w^{l+1})^T \delta^{l+1}) \odot \sigma'(z^l) \quad (6)$$

$$\frac{\partial C}{\partial b_j^l} = \delta_j^l \quad (7)$$

$$\frac{\partial C}{\partial w_{jk}^l} = a_k^{l-1} \delta_j^l \quad (8)$$

As these are standard backpropagation equations, they will not be described in detail herein, other than to note that the T of Eq. (6) indicates a matrix transpose, the σ' of Eq. (6) denotes a derivative of the sigmoid function σ, and the symbol ⊙ denotes a Hadamard product, i.e., an elementwise product of two vectors.

Based on these equations (or, in some cases, other standard backpropagation equations), the synaptic weights w of the DNN may be updated based on a desired output of the neural network y=y(x) provided by the user, which may be input for training purposes and used in conjunction with the existing bias values b, weights w and activation values a already stored. For example, the desired outputs, y(x), sometimes called in the literature "learning labels" or "learning targets" of a supervised learning scheme may be provided by the user/host device to the DLA NAND.

For complex DNNs—especially massive DNNs with many layers—the computation of the many feedforward values and the backpropagation values can be time consuming. Hence, it would be desirable to provide a high performance DNN system configured for massive parallel neural network processing that is fast, efficient and consumes low power. Providing an efficient latch-based method of detecting parity errors in neural network weights and trimming those erroneous values at high speed and using low power helps achieve this goal.

Thus, some aspects disclosed herein relate to performing parity detection and trimming operations using NVM latches. In some examples, additional processing circuitry may be provided in the form of extra-array components of a NAND die, e.g., to implement feedforward and backpropagation neural network operations and computations. Thus, in some examples, a high performance DNN system is disclosed that includes flash NAND dies with on-chip DLAs with latch-based neural network parity detectors. This keeps the data in the NAND and executes operations to check and correct the DNN without needing to use a separate processor (such as the processor of a data storage controller).

In some examples, by performing latch-based parity detection and trimming operations, error correction coding (ECC) need not be used. This reduces overhead in many cases because many devices have an ECC overhead of 10% or more. With simple parity bits, the storage overhead can be much lower. This also saves the controller effort in the correction of bit errors. Still further, on-chip parity detection and trimming helps to support other in-memory computing operations in the NAND, so that the DNN can have all of the necessary corrections done in the NAND with various mathematical operations also performed in the NAND. The on-chip parity bit detection and trimming can be massively parallel, e.g., it could be performed on several planes at once and in hundreds of NVM dice in a drive at the same time. In some examples, the parity detection and trimming are performed using bit manipulations on standard NAND latches (e.g., XDL, ADL, BDL, and CDL latches). In other examples, additional circuit components may be added, such as barrel shifter circuits, to facilitate some aspects of the procedure.

Although described with reference to latches, it should be understood that other equivalent devices may be used, such as data storage registers. Generally speaking, a latch may be a circuit with states for storing information. In some aspects, the latch is a flip-flop circuit for storing two states. A latch may be referred to as a data storage element and may store a plurality of bits of data where each bit is in one of two states: either 0 or 1. In other aspects, a latch may be a memory unit with two or more states. In some aspects, a latch may be referred to as a cache memory and may be configured as a memory element for temporarily holding data. Latches are typically volatile memory devices (even when implemented as a component on an NVM die). However, a latch might be implemented as a NVM device (although that would typically be too slow for practical use). Further, although described primarily with reference to NVM arrays, aspects of the disclosure apply to volatile memory chips as well.

Exemplary SSD Implementation of Latch-Based Parity Detection and Trimming

FIG. 1 is a block diagram of a system 100 including an exemplary SSD having an NVM with latch-based parity detection and trimming units in accordance with aspects of the disclosure. The NVM array may also include various on-chip deep learning DLA components. The system 100 includes a host 102 and an SSD 104 coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples. Additionally or alternatively, the host 102 may be a system or device having a need for neural network processing, such as speech recognition, computer vision, and self-driving vehicles. For example, the host 102 may be a component of a self-driving system of a vehicle.

The SSD 104 includes a host interface 106, a controller 108, a memory 110 (such as a random access memory (RAM)), an NVM interface 112 (which may be referred to as a flash interface), and an NVM 114, such as one or more NAND dies. The NVM 114 may be configured with latch-based parity detection and trimming units. The host interface 106 is coupled to the controller 108 and facilitates communication between the host 102 and the controller 108. The controller 108 is coupled to the memory 110 as well as to the NVM 114 via the NVM interface 112. The host interface 106 may be any suitable communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link.

The controller 108 controls operation of the SSD 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The memory 110 may be any suitable memory, computing device, or system capable of storing data. For example, the memory 110 may be ordinary RAM, DRAM, double data rate (DDR) RAM (DRAM), static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory. The NVM 114 receives data from the controller 108 via the NVM interface 112 and stores the data. The NVM 114 may be any suitable type of non-volatile memory, such as a NAND-type flash memory or the like. In the example of FIG. 1, the controller 108 may include hardware, firmware, software, or any combinations thereof that provide a deep learning neural network controller 116 for use with the NVM array 114.

Although FIG. 1 shows an example SSD and an SSD is generally used as an illustrative example in the description throughout, the various disclosed embodiments are not necessarily limited to an SSD application/implementation. As an example, the disclosed NVM die and associated processing components can be implemented as part of a package that includes other processing circuitry and/or components. For example, a processor may include, or otherwise be coupled with, embedded NVM and associated circuitry and/or components for deep learning that are described herein. The processor could, as one example, off-load certain deep learning tasks to the NVM and associated circuitry and/or components. As another example, the controller 108 may be a controller in another type of device and still include the neural network controller 116 and perform some or all of the functions described herein.

Figure 2:
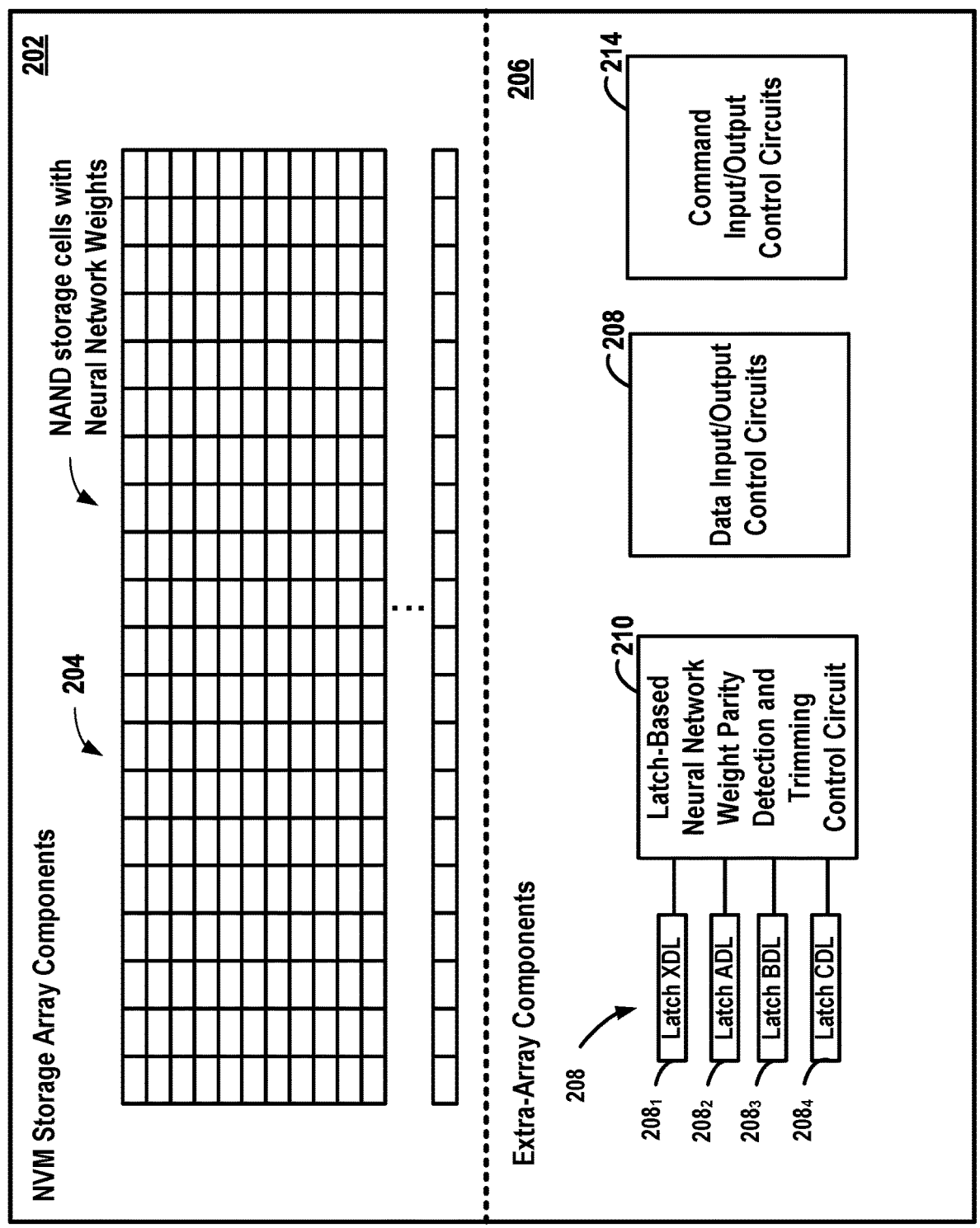
FIG. 2 illustrates an example of an NVM die having processing components configured for latch-based neural network weight parity detection and trimming, according to aspects of the present disclosure.

FIG. 2 is a block diagram illustrating an exemplary NVM die 200 configured for performing latch-based neural network weight parity detection and trimming, such as within a device that also has an on-chip DLA. For clarity, FIG. 2 omits other components that may be used to perform DLA procedures. Other figures, discussed below, illustrate those additional features. (See, e.g., FIGS. 5 and 6.) NVM die 200 includes NVM storage array components 202 that include NAND storage cells 204 for storing neural network weights (and other neural network data), where the cells may be arranged in word lines, blocks, planes, or the like. NVM die 200 also includes extra-array processing components 206, which are referred to herein as "extra-array" because they are not part of the array of NAND storage cells 204. The extra-array components 206 may be configured, for example, as under-the-array or next-to-the array circuit components, and may include otherwise standard NAND die latches (e.g., XDL, ADL, BDL, CDL latches). Although not shown, the NVM die 200 may also include a separate sense latch (and potentially other data latches such as a DDL latch).

In the example of FIG. 2, the exemplary processing components 206 include: a set of latches 208, specifically $208_1$, $208_2$, $208_3$, and $208_4$, a latch-based neural network weight parity detection and trimming control circuit 210 for controlling the latches 208 to perform parity detection and trimming operations, data input/output control circuits 212 for inputting data from the data storage controller (e.g., controller 108 of FIG. 1) and outputting data to the data storage controller; and command input/output control circuits 214 for inputting commands from the data storage controller, e.g., NVM read commands or write (program) commands and for outputting signals indicating completion of the commands (or error indicators if, for some reason, a particular command is not executed). Although not shown within FIG. 2, the control circuit 210 may include various OR circuits, AND circuits, shift circuits, etc., for performing various latch-based operations on the latches 208. A memory degradation assessment control circuit 216 may also be provided, and connected to one of the latches, for obtaining data from the latches to assess memory degradation using techniques described below. Not all circuit or memory components that might be used in a practical NVM die are illustrated in the figure, such as voltage regulation components, clocks and timing components, etc. Rather only some components and circuits are shown, summarized as blocks.

Exemplary Latch-Based Parity Detection and Trim Procedures

With reference to the following tables, various exemplary latch manipulation sequences will now be described that serve to perform a parity check on a bit string (which may be representative of a floating-point neural network weight) that is read from an NVM array and, if parity is violated (e.g., there has been a single bit flip in the stored data), a trim is performed to zero out all bits in the bit string. The first several tables are 4-bit examples that provide simplified examples. In practice, it is unlikely that neural network weights will be represented by only 4 bits in practical systems. Accordingly, 8-bit and 16-bit examples are also provided. The parity detection and trimming techniques represented by the exemplary bit manipulations provided herein may be extrapolated to larger examples, such as 32-bit or 64-bit cases. These procedures detect parity errors (e.g., a single bit flip or some other odd number of bit flips) and trim the data accordingly. Two bit flips (or some other even number of bit flips) in the same neural network weight do not change parity and hence are not detected or trimmed.

Although described with respect to processing neural network weights, especially those corresponding to floating point values represented by binary strings, the parity detection and trimming procedures described herein are applicable to other types of parity-encoded data as well. Generally speaking, these procedures may be advantageous in any data processing system where one can trim values upon detection of a parity violation (e.g., by setting the parity-violating bit string to all zeroes) rather than correcting the parity error.

Note that in these examples, the data is initially stored as a parity-encoded binary sequence. For example, to encode seven bits of data, eights bits may be used. In a simple example, the first seven bits might be used to store the data, whereas the eighth bit records the parity of those seven bits. However, the last bit need not be the parity bit. More generally, the parity bit is set to ensure the total number of 1s in the bit string is either even or odd, depending upon whether even parity or odd parity is used. For even parity, for a particular sequence of bits, the occurrences of 1s are counted. If the count is odd, the parity bit value is set to 1 to thereby make the total count of 1s in the whole sequence (including the added parity bit) an even number. If the count of 1s is already even, the parity bit value is set to 0. For odd parity, this coding is reversed. For a sequence of bits, if the count of 1s is even, the parity bit is set to 1 to make the total count of 1s in the sequence (including the parity bit) an odd number. If the count of 1 bits is odd, the count is already odd so the parity bit value is 0. Parity bit encoding is well-known by those skilled in the art and will not be described further herein. The examples herein assume that even bit parity is used but the procedures may be modified for odd bit parity.

Generally speaking, these procedures operate to perform a linear series of latch operations on a parity-encoded neural network weight read from memory to isolate the parity bit within a particular bit location in one of the latches (e.g., the first bit location of the XDL latch), and then to perform an additional series of latch operations that serve to put either all zeroes in a particular one of the latches (e.g., the XDL latch), if parity was violated, or instead put the original neural network weight in that latch (e.g., the XDL latch), if parity was not violated. The resulting bit sequence then can be read from that latch and re-stored in memory (to thereby trim the neural network weight if parity had been violated) or used in neural network processing, such as within the above-described feedforward or backpropagation procedures.

The latch operations described herein are performed without requiring decision logic, i.e., a high-speed linear process flow is provided. Herein, a linear sequence or linear flow is a sequence of operations that does not include or require any logical decisions that cause processing to branch into two or more processing flows. Generally speaking, linear sequences are much faster, especially when implemented using high speed latches and corresponding high speed AND circuits, OR circuits, shift circuits, etc. However, in some aspects and embodiments, non-linear process flow may be utilized, including operations that employ logical decisions or the like.

Table I illustrates a first exemplary 4-bit example that provides a series of twenty latch operations that may be performed by control circuit 210 of FIG. 2 to perform a parity check on a 4-bit data string (e.g., a 4-bit neural network weight) using the latches 208 of FIG. 2 (assuming they are 4-bit latches) and to also zero out the 4-bit data string if the parity check fails (e.g., trim the neural network weight). In the first load operation, a 4-bit weight (or other 4-bit data string) is loaded into the BDL latch. The 4-bit string is denoted herein as ABCD. Upon completion of the latch manipulations, the XDL latch stores the final result. That is, if parity was not violated (e.g., no bit flip occurred), the XDL latch stores the initial bit string: ABCD. If parity is violated (e.g., a single bit flip occurred), the XDL latch instead stores 0000, e.g., the data is set to zero to trim the corresponding neural network weight. Note, again, that this final result is achieved without any decision step. That is, logic is not required to make a determination whether parity was violated and then follow one of two separate processing branches depending upon the determination. Rather, the final result in the XDL latch, 0000 or ABCD, arises as a result of the particular sequence of bit manipulations of the procedure. This allows for high speed and low energy consumption.

Although not shown in the table, the value in the final result in the XDL latch can be read from the latch and re-stored to memory or used in neural network operations. Note that the left and right shifts may be performed using a barrel shifter circuit, if provided on the die.

TABLE I

|   | LATCH OPERATION | LATCHES EMPLOYED |
|---|---|---|
| 1 | LOAD | Weight --> BDL |
| 2 | COPY | BDL --> ADL |
| 3 | LEFT SHIFT | ADL << 1 --> XDL |
| 4 | XOR | ADL ^ XDL --> XDL |
| 5 | COPY | XDL --> CDL |
| 6 | LEFT SHIFT | XDL << 1 --> ADL |
| 7 | LEFT SHIFT | ADL << 1 --> XDL |
| 8 | XOR | CDL ^ XDL --> CDL |
| 9 | LOAD | 0x8 --> XDL |
| 10 | AND | CDL & XDL --> XDL |
| 11 | RIGHT SHIFT | XDL >> 1 --> ADL |
| 12 | OR | XDL \| ADL --> XDL |
| 13 | RIGHT SHIFT | XDL >> 1 --> ADL |
| 14 | OR | XDL \| ADL --> XDL |
| 15 | RIGHT SHIFT | XDL >> 1 --> ADL |
| 16 | OR | XDL \| ADL --> XDL |
| 17 | COPY | XDL --> CDL |
| 18 | SET | 0xF --> XDL |
| 19 | XOR | CDL ^ XDL --> XDL |
| 20 | AND | BDL & XDL --> XDL |

Table II illustrates the intermediate values within the XDL latch for each step in the procedure of Table I (where, as noted, the input string is denoted ABCD). Note that the "x" represents an initially unspecified or "don't care" value. In some examples, the latch may be cleared to all zeros before operation of the procedure, though that is not needed since, whatever those initial values are, they will be over-written with new values as the operation proceeds. Note also that when the input weight first appears in the XDL latch, it is shifted and hence the XDL latch stores BCDX at that point, rather than ABCD.

TABLE II

| | XDL LATCH | | | |
|---|---|---|---|---|
| 1 | X | X | X | X |
| 2 | X | X | X | X |
| 3 | B | C | D | X |
| 4 | A^B | B^C | C^D | X |
| 5 | A^B | B^C | C^D | X |
| 6 | A^B | B^C | C^D | X |
| 7 | C^D | X | X | X |
| 8 | C^D | X | X | X |
| 9 | 1 | 0 | 0 | 0 |
| 10 | C^D^A^B | 0 | 0 | 0 |
| 11 | C^D^A^B | 0 | 0 | 0 |
| 12 | C^D^A^B | C^D^A^B | 0 | 0 |
| 13 | C^D^A^B | C^D^A^B | 0 | 0 |
| 14 | C^D^A^B | C^D^A^B | C^D^A^B | 0 |
| 15 | C^D^A^B | C^D^A^B | C^D^A^B | 0 |
| 16 | C^D^A^B | C^D^A^B | C^D^A^B | C^D^A^B |
| 17 | C^D^A^B | C^D^A^B | C^D^A^B | C^D^A^B |
| 18 | 1 | 1 | 1 | 1 |
| 19 | 1^C^D^A^B | 1^C^D^A^B | 1^C^D^A^B | 1^C^D^A^B |
| 20 | A&(1^C^D^A^B) | B&(1^C^D^A^B) | C&(1^C^D^A^B) | D&(1^C^D^A^B) |

The steps of the procedure shown in these tables operate first to check parity by reducing the bits of the weight down to a single bit. This is executed via various shifts and XORs. Once the parity is found, the parity is propagated (e.g., via shifting) or is otherwise applied to all of the other bits (as will be described more fully below). After that, if parity for the weight was violated, the weight is trimmed. In this example, the single bit representing parity is C^D^A^B within the 1st bit location of the XDL latch after the XOR of step 8. If this value (C^D^A^B) is 0, the parity is good. If this value (C^D^A^B) is 1, the parity is bad (e.g., there has been a flipped bit within ABCD). Note that, in this example, determination of the parity includes loading a mask value of 0x8 into the XDL latch at step 9 (which places a binary 1 in the first bit location within the 4-bit latch and zeroes out the other three "don't care" bit locations). The following AND then puts C^D^A^B into the 1st bit location of the XDL latch.

The parity value (C^D^A^B) is then propagated to all of other bits in XDL and into various bit locations within the ADL and CDL, as shown in the tables. See, for example, Table II, which shows C^D^A^B being shifted (propagated) into each of bit locations of XDL during steps 12-16. Note that each bit location within the CDL latch eventually (after step 16) stores the parity value, and each bit location in the ADL latch except the first location of the ADL latch stores the parity value. The first bit location of the ADL latch stores a zero. Then, in step 18, the 4-bit XDL latch is set to all 1s (e.g., SET 0xF). The last two steps of the procedure (steps 19 and 20) serve to (a) set all of the bits in the 4-bit XDL to 0 if parity was violated (thus trimming the weight) or (b) set the bits to ABCD otherwise.

More specifically: the value A&(1^C^D^A^B) in XDL will be 0 following step 20 if parity was violated (regardless of the original input binary value of A) and the value A&(1^C^D^A^B) will be A following step 20 if parity was not violated (i.e., A will retain its original input value). Similarly, the value B&(1^C^D^A^B) in XDL will be 0 if parity was violated (regardless of the original input binary value of B) and the value B&(1^C^D^A^B) will be B if parity was not violated (i.e., B will retain its original input value); the value C&(1^C^D^A^B) will be 0 if parity was violated (regardless of the original input binary value of C) and the value C&(1^C^D^A^B) will be C if parity was not violated (i.e., C will retain its original input value); and the value D&(1^C^D^A^B) will be 0 if parity was violated (regardless of the original input binary value of D) and the value D&(1^C^D^A^B) will be D if parity was not violated (i.e., D will retain its original input value).

Table III illustrates the intermediate values within the ADL latch for each step in the procedure of Table I for the same example where the input string is denoted ABCD.

TABLE III

| | | ADL LATCH | | |
|---|---|---|---|---|
| 1 | X | X | X | X |
| 2 | A | B | C | D |
| 3 | A | B | C | D |
| 4 | A | B | C | D |
| 5 | A | B | C | D |
| 6 | B^C | C^D | X | X |
| 7 | B^C | C^D | X | X |
| 8 | B^C | C^D | X | X |
| 9 | B^C | C^D | X | X |
| 10 | B^C | C^D | X | X |
| 11 | 0 | C^D^A^B | 0 | 0 |
| 12 | 0 | C^D^A^B | 0 | 0 |
| 13 | 0 | C^D^A^B | C^D^A^B | 0 |
| 14 | 0 | C^D^A^B | C^D^A^B | 0 |
| 15 | 0 | C^D^A^B | C^D^A^B | C^D^A^B |
| 16 | 0 | C^D^A^B | C^D^A^B | C^D^A^B |
| 17 | 0 | C^D^A^B | C^D^A^B | C^D^A^B |
| 18 | 0 | C^D^A^B | C^D^A^B | C^D^A^B |
| 19 | 0 | C^D^A^B | C^D^A^B | C^D^A^B |
| 20 | 0 | C^D^A^B | C^D^A^B | C^D^A^B |

Table IV illustrates the intermediate values within the BDL latch for each step in the procedure of Table I for the same example where the input string is denoted ABCD. The input weight ABCD remains unchanged within the BDL latch throughout the procedure.

TABLE IV

| | | BDL LATCH | | |
|---|---|---|---|---|
| 1 | A | B | C | D |
| 2 | A | B | C | D |
| 3 | A | B | C | D |
| 4 | A | B | C | D |
| 5 | A | B | C | D |
| 6 | A | B | C | D |
| 7 | A | B | C | D |
| 8 | A | B | C | D |
| 9 | A | B | C | D |
| 10 | A | B | C | D |
| 11 | A | B | C | D |
| 12 | A | B | C | D |
| 13 | A | B | C | D |
| 14 | A | B | C | D |
| 15 | A | B | C | D |
| 16 | A | B | C | D |
| 17 | A | B | C | D |
| 18 | A | B | C | D |
| 19 | A | B | C | D |
| 20 | A | B | C | D |

Table V illustrates the intermediate values within the CDL latch for each step in the procedure of Table I for the same example where the input string is denoted ABCD.

TABLE V

| | | CDL LATCH | | |
|---|---|---|---|---|
| 1 | X | X | X | X |
| 2 | X | X | X | X |
| 3 | X | X | X | X |
| 4 | X | X | X | X |
| 5 | A^B | B^C | C^D | X |
| 6 | A^B | B^C | C^D | X |
| 7 | A^B | B^C | C^D | X |
| 8 | C^D^A^B | X | X | X |
| 9 | C^D^A^B | X | X | X |
| 10 | C^D^A^B | X | X | X |
| 11 | C^D^A^B | X | X | X |
| 12 | C^D^A^B | X | X | X |
| 13 | C^D^A^B | X | X | X |
| 14 | C^D^A^B | X | X | X |
| 15 | C^D^A^B | X | X | X |
| 16 | C^D^A^B | X | X | X |
| 17 | C^D^A^B | C^D^A^B | C^D^A^B | C^D^A^B |
| 18 | C^D^A^B | C^D^A^B | C^D^A^B | C^D^A^B |
| 19 | C^D^A^B | C^D^A^B | C^D^A^B | C^D^A^B |
| 20 | C^D^A^B | C^D^A^B | C^D^A^B | C^D^A^B |

Table VI illustrates a second exemplary 4-bit example that includes a different sequence of bit operations, which uses one less step to perform the operation that the example of Table I and does not use the CDL latch. That is, the example of Table VI employs nineteen operations or steps and one fewer latch, and hence is somewhat more efficient. Note that in step 9, a mask 0x8 is again loaded into the XDL latch. For the sake of brevity, detailed tables showing the particular values within each of the four latches for each of the steps of the procedure of Table VI are not provided herein (as they were for the example of Tables I-V) but one can determine the values for those entries based on the listed latch operations.

TABLE VI

| | LATCH OPERATION | LATCHES EMPLOYED |
|---|---|---|
| 1 | LOAD | Weight --> BDL |
| 2 | COPY | BDL --> ADL |
| 3 | LEFT SHIFT | ADL << 1 --> XDL |
| 4 | LEFT SHIFT | XDL << 1 --> ADL |
| 5 | COPY | BDL --> XDL |
| 6 | XOR | ADL ^ XDL --> XDL |
| 7 | LEFT SHIFT | XDL << 1 --> ADL |
| 8 | XOR | XDL ^ ADL --> ADL |
| 9 | LOAD | 0x8 --> XDL |
| 10 | AND | ADL & XDL --> XDL |
| 11 | RIGHT SHIFT | XDL >> 1 --> ADL |
| 12 | OR | XDL | ADL --> XDL |
| 13 | RIGHT SHIFT | XDL >> 1 --> ADL |
| 14 | OR | XDL | ADL --> XDL |
| 15 | RIGHT SHIFT | XDL >> 1 --> ADL |
| 16 | OR | XDL | ADL --> XDL |
| 17 | SET | 0xF --> XDL |
| 18 | XOR | ADL ^ XDL --> XDL |
| 19 | AND | BDL & XDL --> XDL |

Table VII illustrate a third exemplary 4-bit example with a different sequence of bit operations. Note that in step 9, a mask 0x8 is again loaded into the XDL latch. Here again, the CDL latch is not used. The input weight ABCD again remains unchanged within the BDL latch. For the sake of brevity, detailed tables showing the particular values within each of the four latches for each of the steps of the procedure of Table VII are not provided herein but one can determine the values for those entries based on the listed latch operations.

TABLE VII

| | LATCH OPERATION | LATCHES EMPLOYED |
|---|---|---|
| 1 | LOAD | Weights --> BDL |
| 2 | COPY | BDL --> ADL |
| 3 | LEFT SHIFT | ADL << 1 --> XDL |
| 4 | XOR | ADL ^ XDL --> XDL |
| 5 | LEFT SHIFT | XDL << 1 --> ADL |
| 6 | XOR | XDL ^ ADL |
| 7 | LEFT SHIFT | XDL << 1 --> ADL |
| 8 | XOR | XDL ^ XDL --> ADL |
| 9 | LOAD | 0x8 --> XDL |

TABLE VII-continued

| | LATCH OPERATION | LATCHES EMPLOYED |
|---|---|---|
| 10 | AND | ADL & XDL --> XDL |
| 11 | RIGHT SHIFT | XDL >> 1 --> ADL |
| 12 | OR | XDL | ADL --> XDL |
| 13 | RIGHT SHIFT | XDL >> 1 --> ADL |
| 14 | OR | XDL | ADL --> XDL |
| 15 | RIGHT SHIFT | XDL >> 1 --> ADL |
| 16 | OR | XDL | ADL --> ADL |
| 17 | SET | 0xF --> XDL |
| 18 | XOR | ADL ^ XDL --> XDL |
| 19 | AND | BDL & XDL --> XDL |

Table VIII illustrates a fourth exemplary 4-bit example that includes a different sequence of bit operations, which uses twenty operations or steps. Note that in step 9, a different mask 0x2 is loaded into the XDL latch. This is so that a binary 1 is loaded into the third bit field or bit location of the 4-bit XDL latch in this stage of the procedure (rather than into the first bit location of the XDL latch as in the previous examples). For the sake of brevity, detailed tables showing the particular values within each of the four latches for each of the steps of the procedure of Table VIII are not provided herein but one can determine the values for those entries based on the listed latch operations.

TABLE VIII

| | LATCH OPERATION | LATCHES EMPLOYED |
|---|---|---|
| 1 | LOAD | Weight --> BDL |
| 2 | COPY | BDL --> ADL |
| 3 | LEFT SHIFT | ADL << 1 --> XDL |
| 4 | XOR | ADL ^ XDL --> XDL |
| 5 | RIGHT SHIFT | XDL>>1 --> ADL |
| 6 | COPY | XDL --> CDL |
| 7 | RIGHT SHIFT | ADL>>1 --> XDL |
| 8 | XOR | CDL ^ XDL --> CDL |
| 9 | LOAD | 0x2 --> XDL |
| 10 | AND | CDL & XDL --> XDL |
| 11 | RIGHT SHIFT | XDL >> 1 --> ADL |
| 12 | OR | XDL | ADL --> XDL |
| 13 | LEFT SHIFT | XDL << 1 --> ADL |
| 14 | OR | XDL | ADL --> XDL |
| 15 | LEFT SHIFT | XDL << 1 --> ADL |
| 16 | OR | XDL I ADL --> ADL |
| 17 | SET | 0xF --> XDL |
| 18 | XOR | ADL ^ XDL --> XDL |
| 19 | AND | BDL & XDL --> XDL |

Table IX illustrates a first exemplary 8-bit example that provides a series of latch operations that may be performed by control circuit 210 of FIG. 2 to perform a parity check on an 8-bit data string (e.g., an 8-bit neural network weight) using the latches 208 of FIG. 2 (assuming they are 8-bit latches) and to also zero out the 8-bit data string if the parity check fails (e.g., trim the neural network weight). In the first load operation, an 8-bit weight (or other 8-bit data string) is loaded into the BDL latch. The 8-bit string is denoted herein as ABCDEFGH. Upon completion of the latch manipulations, the XDL latch stores the final result. That is, if parity was not violated (e.g., no bit flip occurred), the XDL latch stores the initial bit string: ABCDEFGH. If parity is violated (e.g., a single bit flip occurred), the XDL latch instead stores 00000000, e.g., the data is reset to zero to trim the corresponding neural network weight. As with the 4-bit examples discussed above, the final result of this 8-bit example is achieved without any decision step. The final result, 00000000 or ABCDEFGH, arises as a result of the particular linear sequence of bit manipulations of the procedure.

The particular example of Table IX employs thirty-four operations or steps. Note that in step 15, a mask 0x20 is loaded into the 8-bit XDL latch. This is so that a binary 1 is loaded into the third bit location of the 8-bit XDL latch. Later, in step 32, the 8-bit XDL latch is set to all 1s (e.g., SET 0xFF). The last two steps then serve to (a) set all of the bits in the 8-bit XDL to 0 if parity is violated (thus trimming the weight) or (b) set the bits to ABCDEFGH otherwise. The various left and right shifts again may be performed using a barrel shifter circuit. For the sake of brevity, detailed tables showing the particular values within each of the four latches for each of the steps of the procedure of Table IX are not provided herein but one can determine the values for those entries based on the listed latch operations.

TABLE IX

| | LATCH OPERATION | LATCHES EMPLOYED |
|---|---|---|
| 1 | LOAD | Weight --> BDL |
| 2 | COPY | BDL --> ADL |
| 3 | LEFT SHIFT | ADL << 1 --> XDL |
| 4 | XOR | ADL ^ XDL --> XDL |
| 5 | RIGHT SHIFT | XDL>>1 --> ADL |
| 6 | COPY | XDL --> CDL |
| 7 | RIGHT SHIFT | ADL>>1 --> XDL |
| 8 | XOR | CDL ^ XDL --> XDL |
| 9 | COPY | XDL --> CDL |
| 10 | LEFT SHIFT | XLD << 1 --> ADL |
| 11 | LEFT SHIFT | ADL << 1 --> XDL |
| 12 | LEFT SHIFT | XLD << 1 --> ADL |
| 13 | LEFT SHIFT | ADL << 1 --> XDL |
| 14 | XOR | CDL ^ XDL --> CDL |
| 15 | LOAD | 0x20 --> XDL |
| 16 | AND | CDL & XDL --> XDL |
| 17 | LEFT SHIFT | XDL << 1 --> ADL |
| 18 | OR | XDL | ADL --> XDL |
| 19 | LEFT SHIFT | XDL << 1 --> ADL |
| 20 | OR | XDL | ADL --> XDL |
| 21 | RIGHT SHIFT | XDL >> 1 --> ADL |
| 22 | OR | XDL | ADL --> XDL |
| 23 | RIGHT SHIFT | XDL >> 1 --> ADL |
| 24 | OR | XDL | ADL --> XDL |
| 25 | RIGHT SHIFT | XDL >> 1 --> ADL |
| 26 | OR | XDL | ADL --> XDL |
| 27 | RIGHT SHIFT | XDL >> 1 --> ADL |
| 28 | OR | XDL | ADL --> XDL |
| 29 | RIGHT SHIFT | XDL >> 1 --> ADL |
| 30 | OR | XDL | ADL --> XDL |
| 31 | COPY | XDL --> CDL |
| 32 | SET | 0xFF --> XDL |
| 33 | XOR | CDL ^ XDL --> XDL |
| 34 | AND | BDL & XDL --> XDL |

Table X illustrates a second exemplary 8-bit example, which employs only thirty-two operations or steps, and hence is somewhat more efficient that the Table V example. For the sake of brevity, detailed tables showing the particular values within each of the four latches for each of the steps of the procedure of Table X are not provided herein but one can determine the values for those entries based on the listed latch operations.

TABLE X

| | LATCH OPERATION | LATCHES EMPLOYED |
|---|---|---|
| 1 | LOAD | Weight --> BDL |
| 2 | COPY | BDL --> ADL |
| 3 | LEFT SHIFT | ADL << 1 --> XDL |
| 4 | XOR | ADL ^ XDL --> XDL |
| 5 | RIGHT SHIFT | XDL>>1 --> ADL |
| 6 | COPY | XDL --> CDL |
| 7 | RIGHT SHIFT | ADL>>1 --> XDL |
| 8 | XOR | CDL ^ XDL --> XDL |

TABLE X-continued

| | LATCH OPERATION | LATCHES EMPLOYED |
|---|---|---|
| 9 | COPY | XDL --> CDL |
| 10 | LEFT SHIFT | XLD << 1 --> ADL |
| 11 | LEFT SHIFT | ADL << 1 --> XDL |
| 12 | LEFT SHIFT | XLD << 1 --> ADL |
| 13 | LEFT SHIFT | ADL << 1 --> XDL |
| 14 | XOR | CDL ^ XDL --> CDL |
| 15 | LOAD | 0x20 --> XDL |
| 16 | AND | CDL & XDL --> XDL |
| 17 | LEFT SHIFT | XDL << 1 --> ADL |
| 18 | OR | XDL \| ADL --> XDL |
| 19 | LEFT SHIFT | XDL << 1 --> ADL |
| 20 | OR | XDL \| ADL --> XDL |
| 21 | RIGHT SHIFT | XDL >> 1 --> ADL |
| 22 | OR | XDL \| ADL --> XDL |
| 23 | COPY | XDL --> CDL |
| 24 | RIGHT SHIFT | XDL >> 1 --> ADL |
| 25 | RIGHT SHIFT | ADL >> 1 --> XDL |
| 26 | RIGHT SHIFT | XDL >> 1 --> ADL |
| 27 | RIGHT SHIFT | ADL >> 1 --> XDL |
| 28 | OR | XDL \| CDL --> XDL |
| 29 | COPY | XDL --> CDL |
| 30 | SET | 0xFF --> XDL |
| 31 | XOR | CDL ^ XDL --> XDL |
| 32 | AND | BDL & XDL --> XDL |

Table XI illustrates an exemplary 16-bit example that provides a series of latch operations that may be performed by control circuit 210 of FIG. 2 to perform a parity check on a 16-bit data string (e.g., a 16-bit neural network weight) using the latches 208 of FIG. 2 (assuming they are 16-bit latches) and to also zero out the 16-bit data string if the parity check fails (e.g., trim the neural network weight). In the first load operation, a 16-bit weight (or other 16-bit data string) is loaded into the BDL latch. The 16-bit string is denoted herein as ABCDEFGHIJKLMNOP. Upon completion of the latch manipulations, the XDL latch stores the final result. That is, if parity was not violated (e.g., no bit flip occurred), the XDL latch stores the initial bit string: ABCDEFGHIJKLMNOP. If parity is violated (e.g., a single bit flip occurred), the XDL latch instead stores 0000000000000000, e.g., the data is reset to zero to trim the corresponding neural network weight. As with the examples discussed above, this result is achieved without any decision step. The final result, 0000000000000000 or ABCDEFGHIJKLMNOP, arises as a result of the particular sequence of bit manipulations of the procedure.

The particular example of Table XI employs fifty operations or steps. Note that in step 24, a mask 0x8000 is loaded into the 16-bit XDL latch. This is so that a binary 1 is loaded into the first bit location of the 16-bit XDL latch. Later, in step 48, the 16-bit XDL latch is set to all 1s (e.g., SET 0xFFFF). The last two steps then serve to (a) set all of the bits in the 16-bit XDL to 0 if parity is violated (thus trimming the weight) or (b) set the bits to ABCDEFGHIJKLMNOP otherwise. As with the examples discussed above, this result is achieved without any decision step. The final result arises as a result of the particular sequence of bit manipulations of the procedure. For the sake of brevity, detailed tables showing the particular values within each of the four latches for each of the steps of the procedure of Table XI are not provided herein (as they were for the example of 4-bit example of Tables I-V) but one can determine the values for those entries based on the listed latch operations.

TABLE XI

| | LATCH OPERATION | LATCHES EMPLOYED |
|---|---|---|
| 1 | LOAD | Weight --> BDL |
| 2 | COPY | BDL --> ADL |
| 3 | LEFT SHIFT | ADL << 1 --> XDL |
| 4 | LEFT SHIFT | XDL << 1 --> ADL |
| 5 | LEFT SHIFT | ADL << 1 --> XDL |
| 6 | LEFT SHIFT | XDL << 1 --> ADL |
| 7 | LEFT SHIFT | ADL << 1 --> XDL |
| 8 | LEFT SHIFT | XDL << 1 --> ADL |
| 9 | LEFT SHIFT | ADL << 1 --> XDL |
| 10 | LEFT SHIFT | XDL << 1 --> ADL |
| 11 | XOR | BDL ^ BDL --> ADL |
| 12 | COPY | ADL --> CDL |
| 13 | LEFT SHIFT | ADL << 1 --> XDL |
| 14 | LEFT SHIFT | XDL << 1 --> ADL |
| 15 | LEFT SHIFT | ADL << 1 --> XDL |
| 16 | LEFT SHIFT | XDL << 1 --> ADL |
| 17 | XOR | CDL ^ ADL --> ADL |
| 18 | COPY | ADL --> CDL |
| 19 | LEFT SHIFT | ADL << 1 --> XDL |
| 20 | LEFT SHIFT | XDL << 1 --> ADL |
| 21 | XOR | CDL ^ ADL --> ADL |
| 22 | LEFT SHIFT | ADL << 1 --> XDL |
| 23 | XOR | ADL ^ XDL --> ADL |
| 24 | LOAD | 0x8000 --> XDL |
| 25 | AND | XDL & ADL --> XDL |
| 26 | RIGHT SHIFT | XDL >> 1 --> ADL |
| 27 | OR | XDL \| ADL --> XDL |
| 28 | COPY | XDL --> CDL |
| 29 | RIGHT SHIFT | XDL >> 1 --> ADL |
| 30 | RIGHT SHIFT | ADL >> 1 --> XDL |
| 31 | OR | XDL \| CDL --> XDL |
| 32 | COPY | XDL --> CDL |
| 33 | RIGHT SHIFT | XDL >> 1 --> ADL |
| 34 | RIGHT SHIFT | ADL >> 1 --> XDL |
| 35 | RIGHT SHIFT | XDL >> 1 --> ADL |
| 36 | RIGHT SHIFT | ADL >> 1 --> XDL |
| 37 | OR | XDL \| CDL --> XDL |
| 38 | COPY | XDL --> CDL |
| 39 | RIGHT SHIFT | XDL >> 1 --> ADL |
| 40 | RIGHT SHIFT | ADL >> 1 --> XDL |
| 41 | RIGHT SHIFT | XDL >> 1 --> ADL |
| 42 | RIGHT SHIFT | ADL >> 1 --> XDL |
| 43 | RIGHT SHIFT | XDL >> 1 --> ADL |
| 44 | RIGHT SHIFT | ADL >> 1 --> XDL |
| 45 | RIGHT SHIFT | XDL >> 1 --> ADL |
| 46 | RIGHT SHIFT | ADL >> 1 --> XDL |
| 47 | OR | XDL \| CDL --> CDL |
| 48 | SET | 0xFFFF --> XDL |
| 49 | XOR | CDL ^ XDL --> XDL |
| 50 | AND | BDL & XDL --> XDL |

What has been described with reference to Tables I-XI are various exemplary latch-based procedures for detecting parity violations and trimming values. Other sequences of operations may be designed to perform the procedure, in some cases using more or fewer operations and more or fewer latches. Although well-suited for use within NVM dies that are often configured with suitable latches, aspects of these procedures may be applied to other memory devices as well, such as volatile memories.

Figure 3:
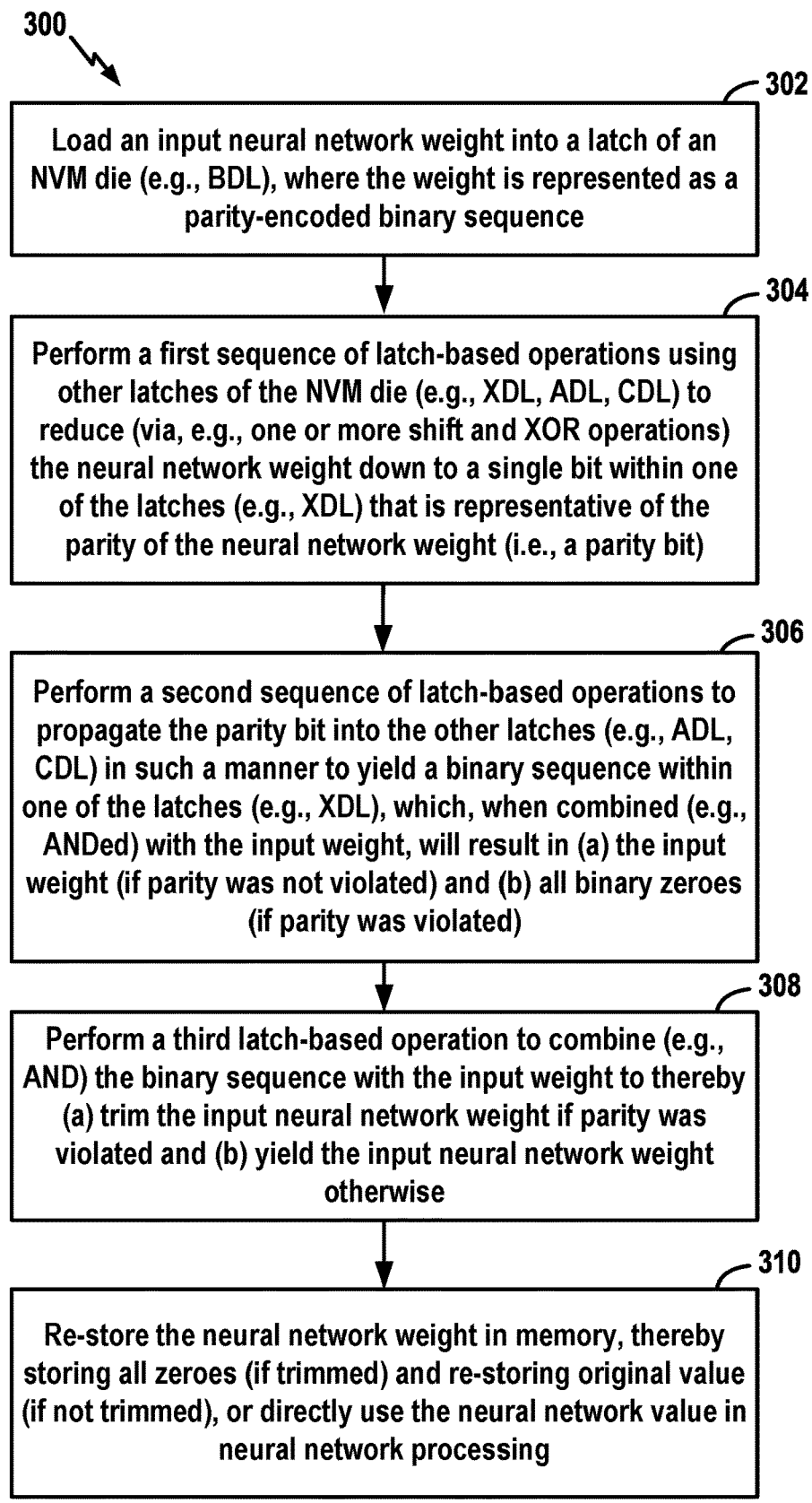
FIG. 3 is a flow chart of an exemplary latch-based method according to aspects of the present disclosure for performing neural network weight parity detection and trimming.

FIG. 3 summarizes some aspects of an illustrative procedure 300, which may be implemented by the control circuit 210 and other components of the NVM die 200 of FIG. 2 using the latches 208 of FIG. 2. Beginning at block 302, the control circuit 210 or other suitable component loads a neural network weight that has been read from memory into a latch of an NVM die (e.g., BDL). The weight is represented as a parity-encoded binary sequence. (The parity encoding of the weight is accomplished by other components prior to initial storage of the weight in the memory.) At block 304, the control circuit 210 performs a first sequence of latch-based operations using other latches of the NVM die (e.g., XDL, ADL, CDL) to reduce (via, e.g., one or more shift and XOR operations) the neural network weight down to a single bit within one of the latches (e.g., XDL) that is representative of the parity of the neural network weight (i.e., the single bit is the parity bit).

At block 306, the control circuit 210 performs a second sequence of latch-based operations to propagate or otherwise apply the parity bit into the other latches (e.g., ADL, CDL) in such a manner as to yield a binary sequence within one of the latches (e.g., XDL), which, when combined (e.g., ANDed) with the input weight, results in the input weight if parity was not violated, and instead results in all binary zeroes if parity was violated. At block 308, the control circuit 210 performs a third or final latch-based operation to combine (e.g., AND) the binary sequence with the input weight to thereby (a) trim the input neural network weight to all zeroes if parity was violated and (b) yield a copy of the input neural network weight otherwise. At block 310, the control circuit 210 or other suitable components on the NVM die re-stores the neural network weight in memory, thereby storing all zeroes (if trimmed) or re-storing the original value (if not trimmed). Alternatively, the neural network weight can be immediately and directly used in neural network processing.

Referring again to Table I, the first sequence of latch-based operations (e.g., as referenced in block 304) corresponds to steps 2-10, which serve to compute and store the parity bit in the first bit location within the XDL latch. The second sequence of latch-based operations (e.g., as referenced in block 306) corresponds to steps 11-19, which serve to propagate the parity bit as needed. Step 20 is the third and final step in this particular example (e.g., as referenced in block 308), which performs the AND to yield the final result, which can then be re-stored in memory or used in neural network operations, such as feedforward procedures.

Exemplary Storage Degradation Assessment

Figure 4:
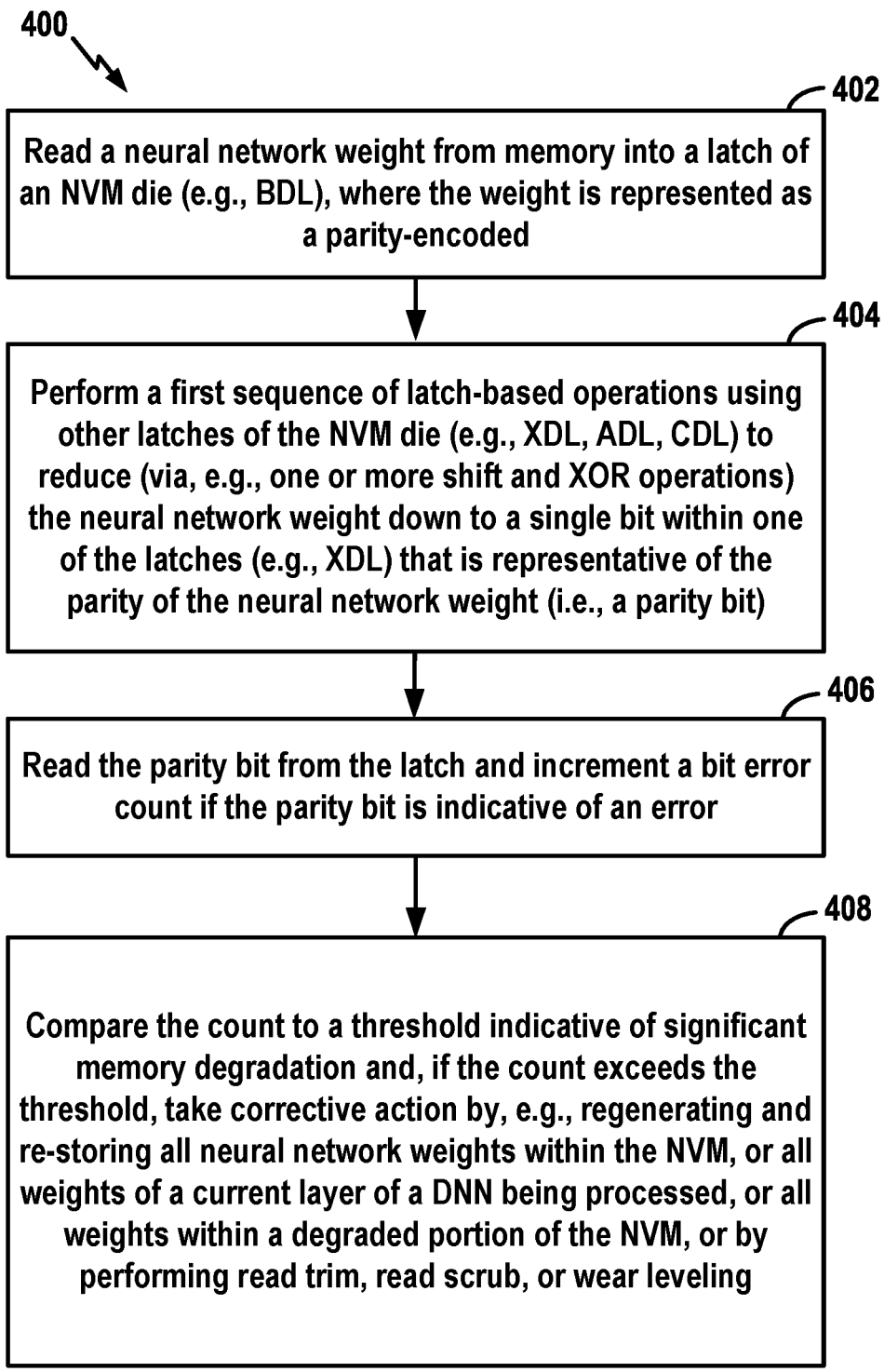
FIG. 4 is a flow chart of an exemplary method according to aspects of the present disclosure for assessing memory degradation.

FIG. 4 summarizes a method 400 for assessing the amount of degradation, if any, the NVM, which may be performed in conjunction with the latch-based parity detection and trimming operations described above, or may be a stand-alone procedure. As already noted, the latch-based parity detection procedures operate to detect a single bit flip in a neural network weight but not two bit flips. Two bit flips in the same neural network weight are highly unlikely unless the NVM has become degraded. Accordingly, it is desirable to assess the amount of degradation, if any, of the NVM to thereby assess the likelihood of two bit flips within the same neural network weight. If the NVM (or a portion of the NVM such as a NAND block) has become degraded to the point that two bit flips within the same neural network weight becomes a significant risk, actions can then be taken to address the issue, such as by regenerating the neural network data and re-storing the data within a different NVM (e.g., a different NVM die of a multi-die array) or within a different portion (e.g., a different NAND block) of the same NVM die. Conveniently, the amount of degradation can be assessed based on the parity bit values isolated by the above-described latch-based operations.

Beginning at block 402 of FIG. 4, the control circuit 210 of FIG. 2 (or other suitable component) reads a neural network weight from memory into a latch of an NVM die (e.g., BDL), where the weight is represented as a parity-encoded binary sequence. At block 404, the latch control circuit performs a sequence of latch-based operations using other latches of the NVM die (e.g., XDL, ADL, CDL) to XOR the neural network weight down to a single bit within one of the latches (e.g., XDL) that is representative of the parity of the neural network weight (i.e., a parity bit). In the example of Tables I-V, this sequence corresponds to steps 2-10, which serve to compute and store the parity bit in the first bit location within the XDL latch.

At block 406, a memory degradation assessment controller (such as the memory degradation assessment control circuit 216 of FIG. 2) reads the parity bit from the latch and increments a bit error count if the parity bit is indicative of an error. In the example of Tables I-V, if the parity bit value (C^D^A^B) is 0, the parity is good. If the parity bit value is 1, the parity is bad. Hence, the memory degradation assessment controller may simply maintain a running count of the parity bit as each neural network weight is processed to thereby provide a count of the parity bit errors. At block 408, the memory degradation assessment controller compares the count to a threshold indicative of significant memory degradation and, if the count exceeds the threshold, the memory degradation assessment controller takes corrective action by, e.g., notifying other components of the overall system to regenerate and re-store all neural network weights within the NVM die, or all weights of a current layer of a DNN being processed, or all weights within a degraded portion of the NVM die such as a particular NAND block. This may involve notifying the host or user of the issue. In some examples, it may be desirable to maintain separate counts for different NAND blocks of the NVM die so that the memory degradation assessment controller can determine whether a particular NAND block has become degraded so that data may then be stored elsewhere on the NVM die. In other examples, the memory degradation assessment controller may trigger other actions such as performing read trim, read scrub, or wear leveling operations. Note that, since a logic decision is used in the procedure of FIG. 4, the procedure is not a linear process flow as in the procedure of FIG. 3.

Exemplary SSD Implementation of Latch-Based Parity Detection and Trimming

Figure 5:
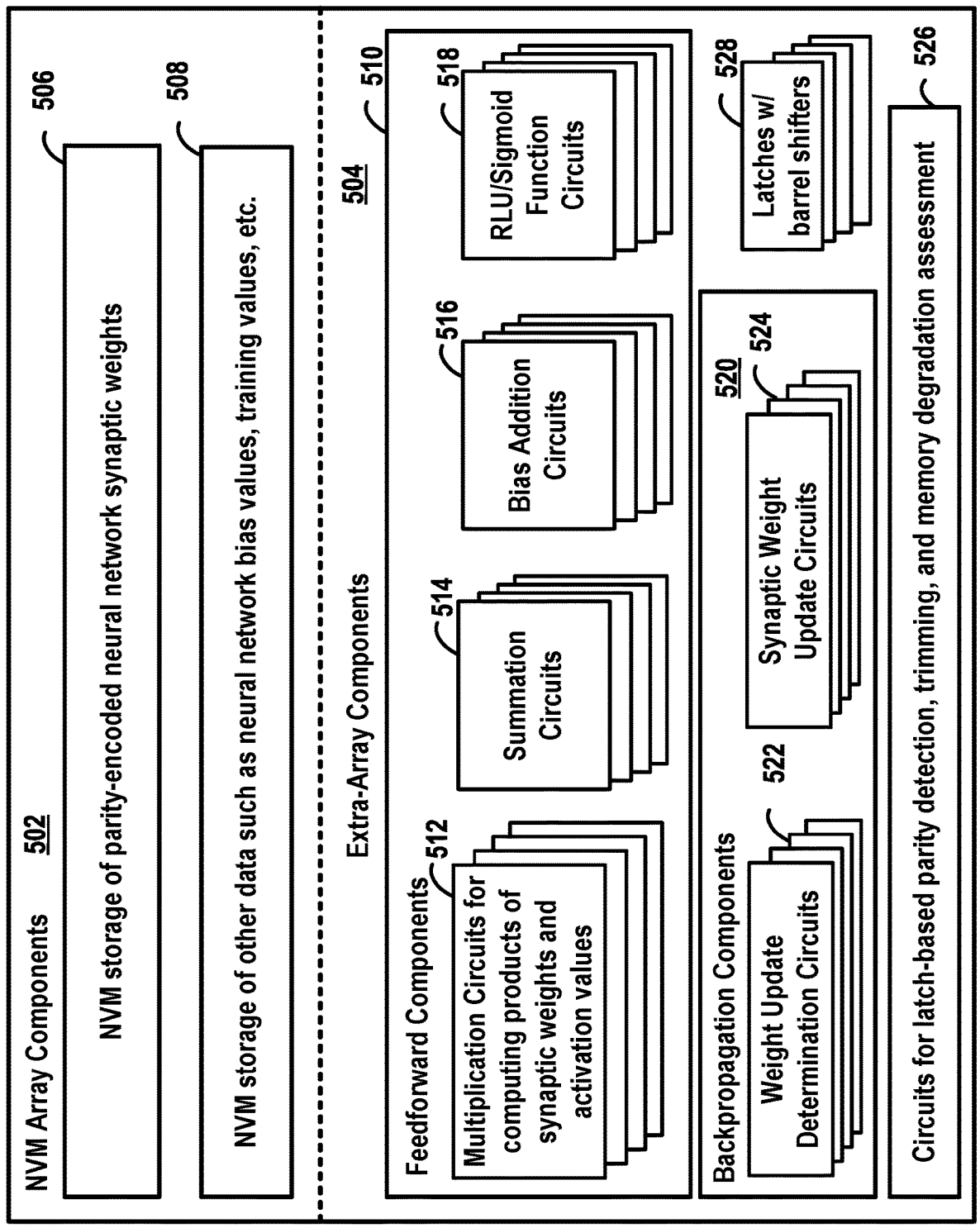
FIG. 5 illustrates an example of an NVM die having feedforward and backpropagation processing components for neural network processing, as well as circuits and latches for latch-based neural network weight parity detection and trimming, according to aspects of the present disclosure.

FIG. 5 illustrates implementation where an NVM die is provided with the above-described parity-detection, trimming, and memory degradation assessment components, as well as DLA components for performing on-chip DNN processing. The exemplary NVM die 500 that includes NVM storage array components 502 and extra-array processing components 504. (Note that not all circuit or memory components that might be used in a practical NVM die are illustrated in the figure, such as input and output components, voltage regulation components, clocks and timing components, etc. Rather only some components and circuits are shown, summarized as block or schematic diagrams.)

The NVM array components 502 include NVM storage 506 configured for storing parity-encoded neural network synaptic weights and NVM storage 508 configured for storing other data such as neural network bias values, training values, etc. Note that the data stored in NVM storage 508 may include non-neural network related data. The NVM processing components 504 include feedforward components 510 configured to perform feedforward neural network operations, such as computing values in accordance with Equation 1, above. In the example of FIG. 5, the feedforward components 510 include: a set of multiplication circuits 512 configured to operate in parallel to compute the products of synaptic weights and activation values (as in, e.g., Equation 1); a set of summation circuits 514 configured to operate in parallel to sum such products (as in, e.g., Equation 1); a set of bias addition circuits 516 configured to operate in parallel to add bias values to the sums (as in, e.g., Equation 1); and a set of RLU/sigmoid function circuits 518, configured to operate in parallel to compute RLU or sigmoid functions of the resulting values (as in, e.g., Equation 1). It is noted that, currently, the RLU function is more typically used within deep neural networks currently, as opposed to a sigmoid. In FIG. 5, only four instances of each of the aforementioned feedforward circuits are shown; however, it should be understood that far more circuits can be configured in parallel with, e.g., separate circuits provided for each of the N layers of a neural network.

The NVM processing components 504 also include backpropagation components 520 configured to perform backpropagation neural network operations, such as to compute values in accordance with Equations 5-8, above. In the example of FIG. 5, the backpropagation components 520 include: a set of weight update determination circuits 522 configured to operate in parallel to compute updates to the synaptic weights (as in, e.g., Equations 5-8) and a set of synaptic weight update circuits 524 configured to operate in parallel to update the synaptic weights stored in NVM storage 506 using the updates computed by circuit 522. As with the feedforward circuits, only four instances of each of the circuits 522 and 524 are shown; however, it should be understood that more circuits can be configured in parallel with, e.g., separate circuits provided for each of the N layers of a neural network.

The feedforward operations and backpropagation operations may be performed iteratively or sequentially using the various weight and bias values of a neural network stored in the NVM array 502, as well as activation values or training values input from an SSD. Initially, default values for the synaptic weights and biases may be input and stored in the NVM array 502. For the purposes of the following descriptions, it is assumed that a set of weights and biases are already stored for use. In an illustrative example, to perform feedforward computations in accordance with Equation 1, a current set of synaptic weights w for the neurons of the first layer of the neural network are sensed from NVM storage 506. The multiplication circuits 512 and the summation circuits 514 may include various components arranged in parallel to multiply individual synaptic weights w with the corresponding activation values a and then sum the results for all of the neurons of the network. Bias values b are sensed from NVM storage 508 and added to the output of the summation circuit 514 using the bias addition circuits 516. Once the biases have been added, the sigmoid function (or RLU) for each result is then computed using the sigmoid/RLU function circuits 518 to yield resulting activation values (e.g., the activation $a'_j$ of a $j^{th}$ neuron in the next layer). These operations proceed layer by layer until each of the layers of the neural network has been processed and a final result calculated, which may be output to the SSD or host.

For backpropagation, synaptic weights and other values (such as bias values) are sensed from the NVM array 502. Values corresponding to the aforementioned desired or known outputs/training values (e.g., y=y(x)) for the neural network may be input from the host. The weight update determination circuits 522 then perform the computations of Equations 5-8, above, to generate updates to the synaptic weights. The updates are applied to the stored synaptic weights of NVM storage 506 by the synaptic weight update circuits 524. In some examples, the synaptic weight update circuits 524 exploit read-modify-write operation to store the updated synaptic weights within the NVM storage 506. The read-modify-write operation may be performed in conjunction with a separate component such as a DRAM of the SSD controller. Once a full series of neural network computations have been completed, such as a full set of feedforward computations to generate a final output result, or a full set of backpropagation computations to update the synaptic weights, a suitable notification signal or indicator value may be sent to the SSD controller using an output component (not shown in FIG. 5).

Circuits 526 for performing the aforementioned latch-based parity detection, trimming, and memory degradation assessment are also provided, along with a set of latches 528, which include barrel shifter circuits. In an exemplary implementation, whenever a neural network weight is read from NVM storage 506, the parity-encoded weight is processed by circuits 526 using latches 528 to trim the parity-encoded weight (if parity was violated) and to increment a count of parity violations to assess and respond to memory degradation.

In the following, various general exemplary procedures and systems are described.

Exemplary Data Storage Device Die

Figure 6:
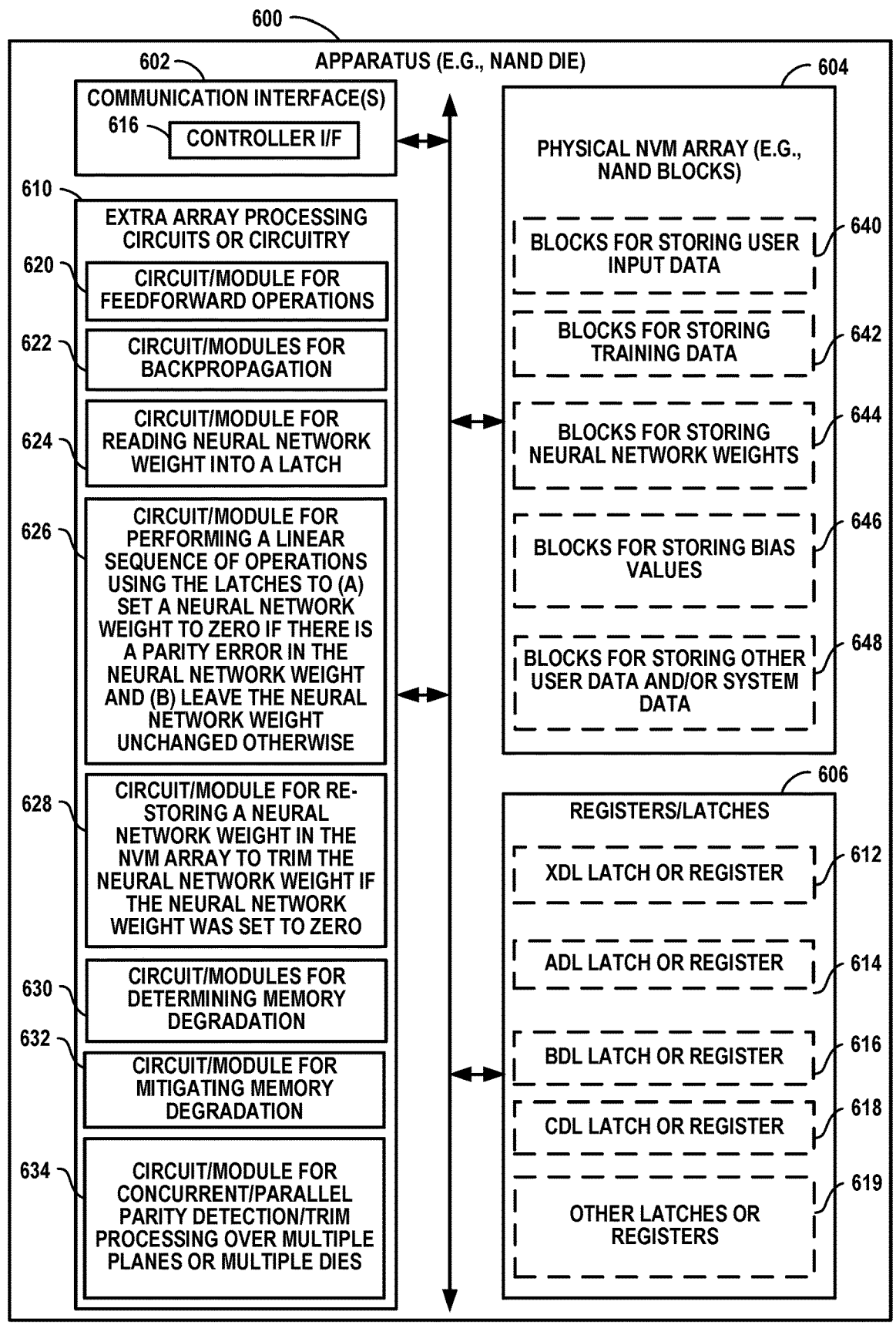
FIG. 6 is a schematic block diagram for an exemplary NVM apparatus such as a NAND die having circuits and latches for latch-based neural network weight parity detection trimming, according to aspects of the present disclosure.

FIG. 6 illustrates an embodiment of an apparatus 600 configured according to one or more aspects of the disclosure. The apparatus 600, or components thereof, could embody or be implemented within a NAND die or some other type of NVM device that supports data storage. In various implementations, the apparatus 600, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes or uses neural network data. (In some aspects, the apparatus is instead a volatile memory chip with a volatile memory data storage array, and the data is not necessarily neural network weight but other types of data.)

The apparatus 600 includes a communication interface 602, a physical memory array (e.g., NAND blocks) 604, a set of registers and/or latches 606, and extra-array processing circuits or circuitry 610 (e.g., circuitry formed on the same die that includes the NVM array). These components can be coupled to and/or placed in electrical communication with one another via suitable components, represented generally by the connection lines in FIG. 6. Although not shown, other circuits such as timing sources, peripherals, voltage regulators, and power management circuits may be provided, which are well known in the art, and therefore, will not be described any further.

The communication interface 602 provides a means for communicating with other apparatuses over a transmission medium. In some implementations, the communication interface 602 includes circuitry and/or programming (e.g., a program) adapted to facilitate the communication of information bi-directionally with respect to one or more devices in a system. In some implementations, the communication interface 602 may be configured for wire-based communication. For example, the communication interface 602 could be a bus interface, a send/receive interface, or some other type of signal interface including circuitry for outputting and/or obtaining signals (e.g., outputting signal from and/or receiving signals into an SSD). The communication interface 602 serves as one example of a means for receiving and/or a means for transmitting.

The physical memory array 604 may represent one or more NAND blocks. The physical memory array 604 may be used for storing data such as neural network weights (or synaptic weights) that are manipulated by the processing circuits 610 or some other component of the apparatus 600. The physical memory array 604 may be coupled to the processing circuits 610 (via, e.g., registers/latches 606) such that the processing circuits 610 can read or sense information from, and write or program information to, the physical memory array 604 (via, e.g., registers/latches 606). That is, the physical memory array 604 can be coupled to the processing circuits 610 so that the physical memory array 604 is accessible by the processing circuits 610. The registers/latches 606 may include one or more of: an XDL latch 612; an ADL latch 614; a BDL latch 616; a CDL latch 618, and one or more other latches or registers 619, such as a sensing latch.

The processing circuits 610 are arranged or configured to obtain, process and/or send data, control data access and storage, issue or respond to commands, and control other desired operations. For example, the processing circuits 610 may be implemented as one or more processors, one or more controllers, and/or other structures configured to perform functions.

According to one or more aspects of the disclosure, the processing circuits 610 may be adapted to perform any or all of the features, processes, functions, operations and/or routines described herein. For example, the processing circuits 610 may be configured to perform any of the steps, functions, and/or processes described with respect to FIGS. 3-11 and 18 (described below). As used herein, the term "adapted" in relation to the processing circuit 610 may refer to the processing circuits 610 being one or more of configured, employed, implemented, and/or programmed to perform a particular process, function, operation and/or routine according to various features described herein. The processing circuits 610 may include a specialized processor, such as an application specific integrated circuit (ASIC) that serves as a means for (e.g., structure for) carrying out any one of the operations described in conjunction with FIGS. 3-11 and 18. The processing circuits 610 serves as one example of a means for processing. In various implementations, the processing circuits 610 may provide and/or incorporate, at least in part, the functionality described above for the processing components of FIGS. 2 and 12.

According to at least one example of the apparatus 600, the processing circuitry 610 may include one or more of: a circuit/module 620 configured for performing feedforward neural network processing operations; a circuit/module 622 configured for performing backpropagation neural network processing operations; a circuit/module 624 configured for reading a neural network weight from the NVM array 604 into a latch (such as into the BDL latch 616); a circuit/module 626 configured for performing a linear sequence of operations using the latches 606 to (a) set a neural network weight to zero if there is a parity error in the neural network weight and (b) leave the neural network weight unchanged otherwise; a circuit/module 628 configured for re-storing a neural network weight in the NVM array 604 to (a) trim the neural network weight if the neural network weight was set to zero (and to retain a current value of the neural network weight if the neural network weight was left unchanged); a circuit/module 630 configured for determining memory degradation; a circuit/module 632 configured mitigating memory degradation (such as by moving the data to a different NAND block, performing a read trim, etc.); and a circuit/module 634 configured for concurrent/parallel parity detection/trim processing over multiple planes or multiple dies (e.g., the circuitry is configured to coordinate the concurrent and/or parallel processing of neural network data across multiple planes or multiple dies, if such coordination is needed).

In at least some examples, means may be provided for performing the functions illustrated in FIG. 6 and/or other functions illustrated or described herein. For example, the means may include one or more of: means, such as circuit/module 620, for performing feedforward neural network processing operations; means, such as circuit/module 622, for performing backpropagation neural network processing operations; means, such as circuit/module 624, for reading a neural network weight from the NVM array 604 into a latch (such as into the BDL latch 616); means, such as circuit/module 626, for performing a linear sequence of operations using the latches 606 to (a) set a neural network weight to zero if there is a parity error in the neural network weight and (b) leave the neural network weight unchanged otherwise; means, such as circuit/module 628, for re-storing a neural network weight in the NVM array 604 to trim the neural network weight if the neural network weight was set to zero (and to retain a current value of the neural network weight if the neural network weight was left unchanged); means, such as circuit/module 630, for determining memory degradation; means, such as circuit/module 632, for mitigating memory degradation (such as by moving the data to a different NAND block, performing a read trim, etc.); and means, such as circuit/module 634, for concurrent/parallel parity detection/trim processing over multiple planes or multiple dies (e.g., for coordinating the concurrent and/or parallel processing of neural network data across multiple planes or multiple dies, if such coordination is needed).

Additional Exemplary Methods and Embodiments

Figure 7:
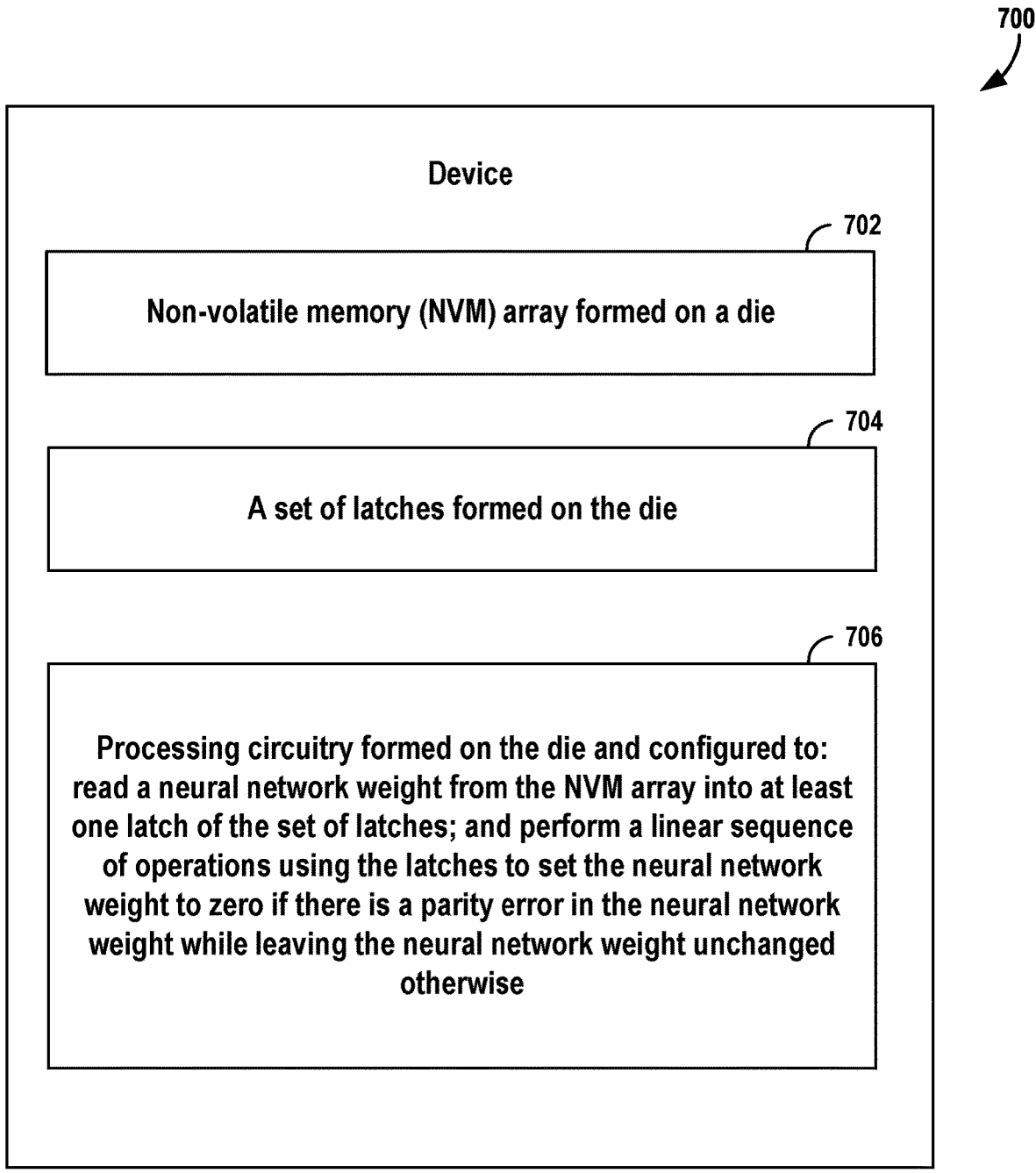
FIG. 7 is a block diagram illustrating an exemplary device according to aspects of the present disclosure.

FIG. 7 is a block diagram of a device 700 in accordance with some aspects of the disclosure. The device 700 (which may be a data storage device) includes an NVM array 702 formed on a die and a set of latches 704 formed on the die. The device 700 also includes a processing circuit or processing circuitry 706 formed on the die and configured to: read a neural network weight from the NVM array into at least one latch of the set of latches; and perform a linear sequence of operations using the plurality of latches to set the neural network weight to zero if there is a parity error in the neural network weight while leaving the neural network weight unchanged otherwise. See, for example, the devices of FIGS. 2, 12, and 13, described above.

Figure 8:
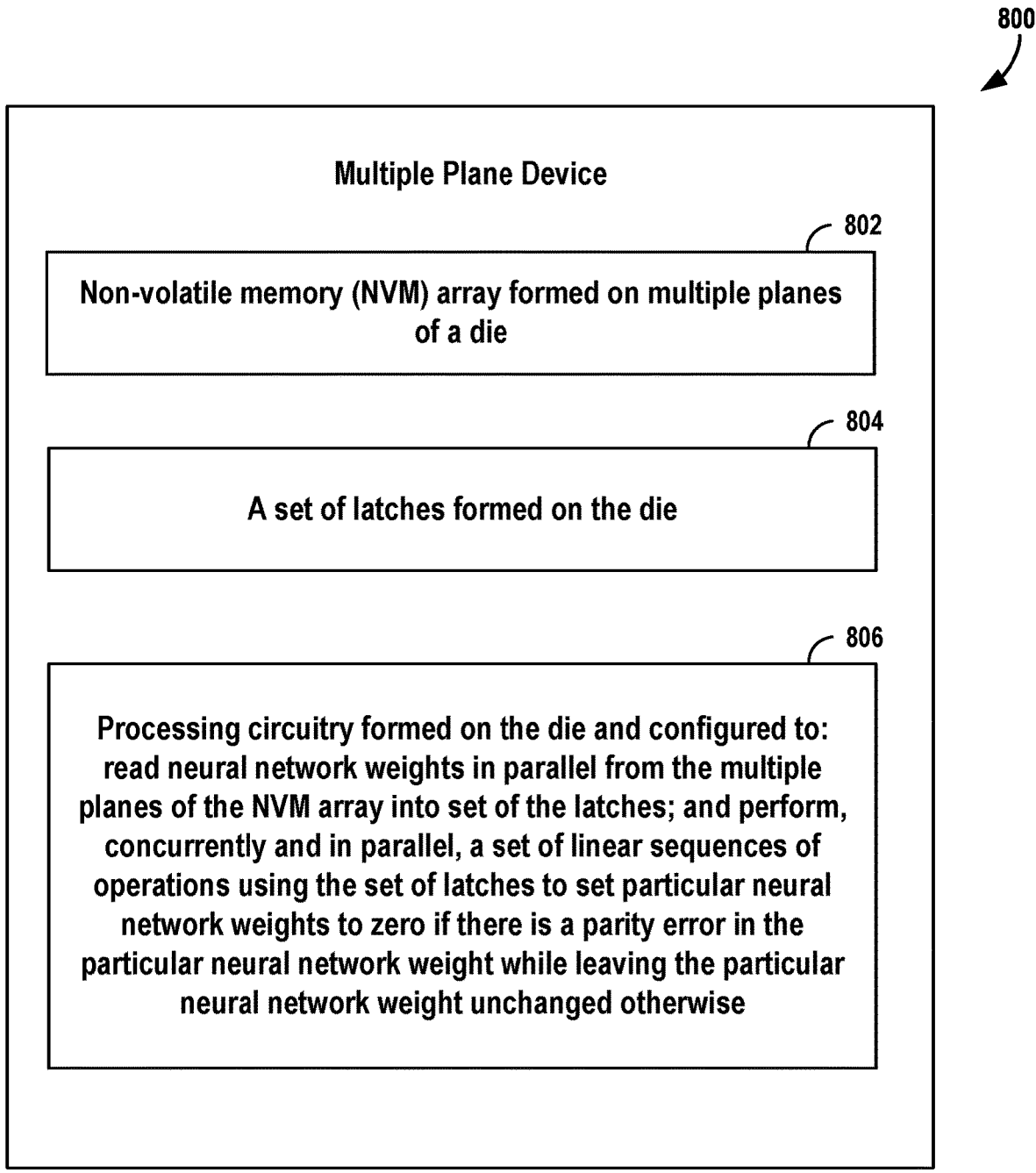
FIG. 8 is a block diagram illustrating an exemplary multiple plane device according to aspects of the present disclosure.

FIG. 8 is a block diagram of a multiple plane device 800 in accordance with some aspects of the disclosure. The device 800 (which may be a data storage device) includes an NVM array 802 formed on multiple planes of a die and a set of latches 804 formed on the die. The device 800 also includes a processing circuit or processing circuitry 806 formed on the die and configured to: read neural network weights in parallel from the multiple planes of the NVM array into the set of latches; and perform, concurrently and in parallel, a set of linear sequences of operations using the set of latches to set particular neural network weights to zero if there is a parity error in the particular neural network weight while leaving the particular neural network weight unchanged otherwise.

Figure 9:
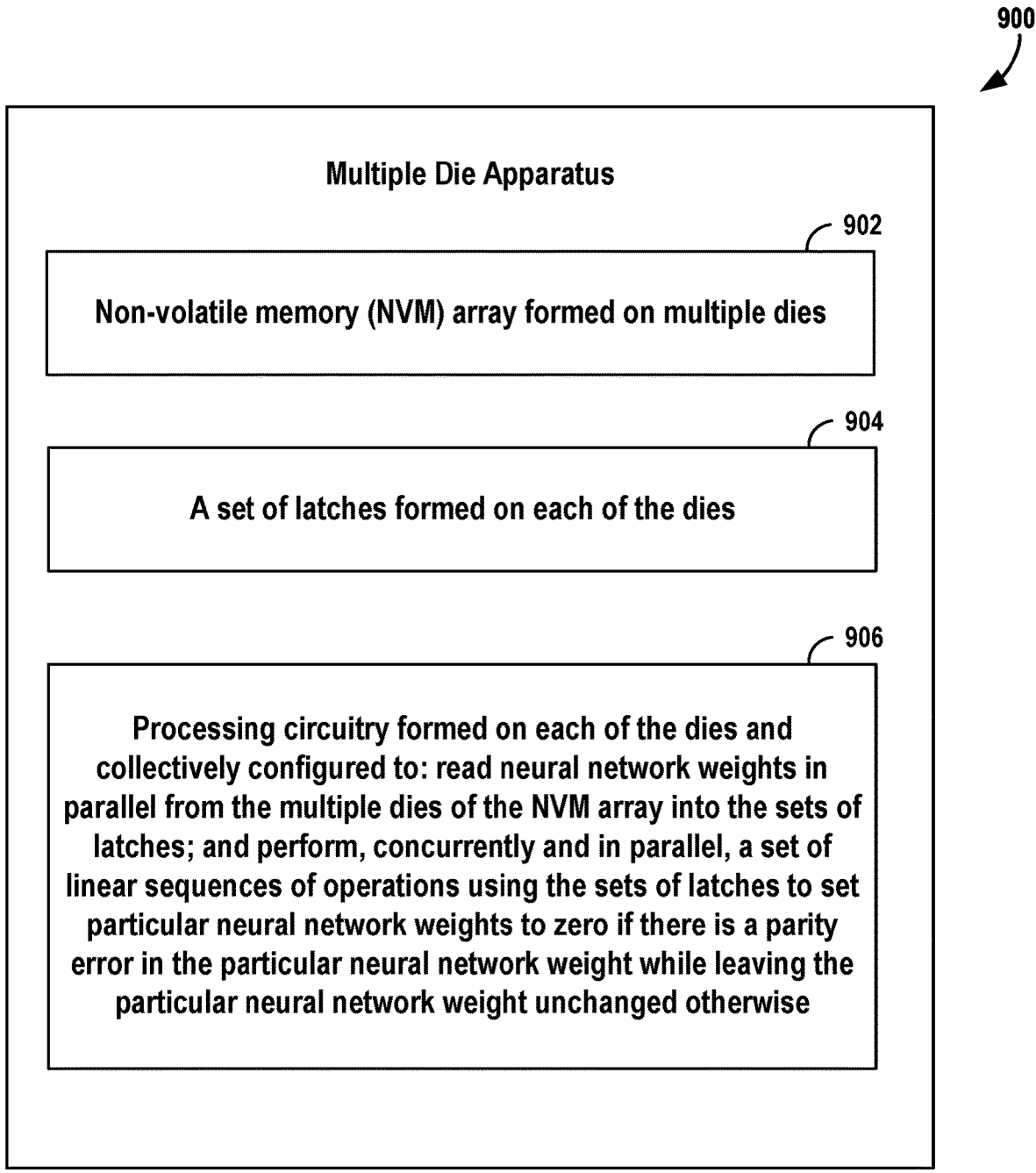
FIG. 9 is a block diagram illustrating an exemplary multiple die device according to aspects of the present disclosure.

FIG. 9 is a block diagram of a multiple die apparatus 900 in accordance with some aspects of the disclosure. The apparatus 1400 (which may be a data storage device or apparatus) includes an NVM array 902 formed on multiple planes of a die and a set of latches 904 formed on each of the dies. The device 900 also includes a processing circuit or processing circuitry 906 formed on each of the dies and configured to: read neural network weights in parallel from the multiple dies of the NVM array into the sets of latches;

and perform, concurrently and in parallel, a set of linear sequences of operations using the sets of latches to set particular neural network weights to zero if there is a parity error in the particular neural network weight while leaving the particular neural network weight unchanged otherwise.

Figure 10:
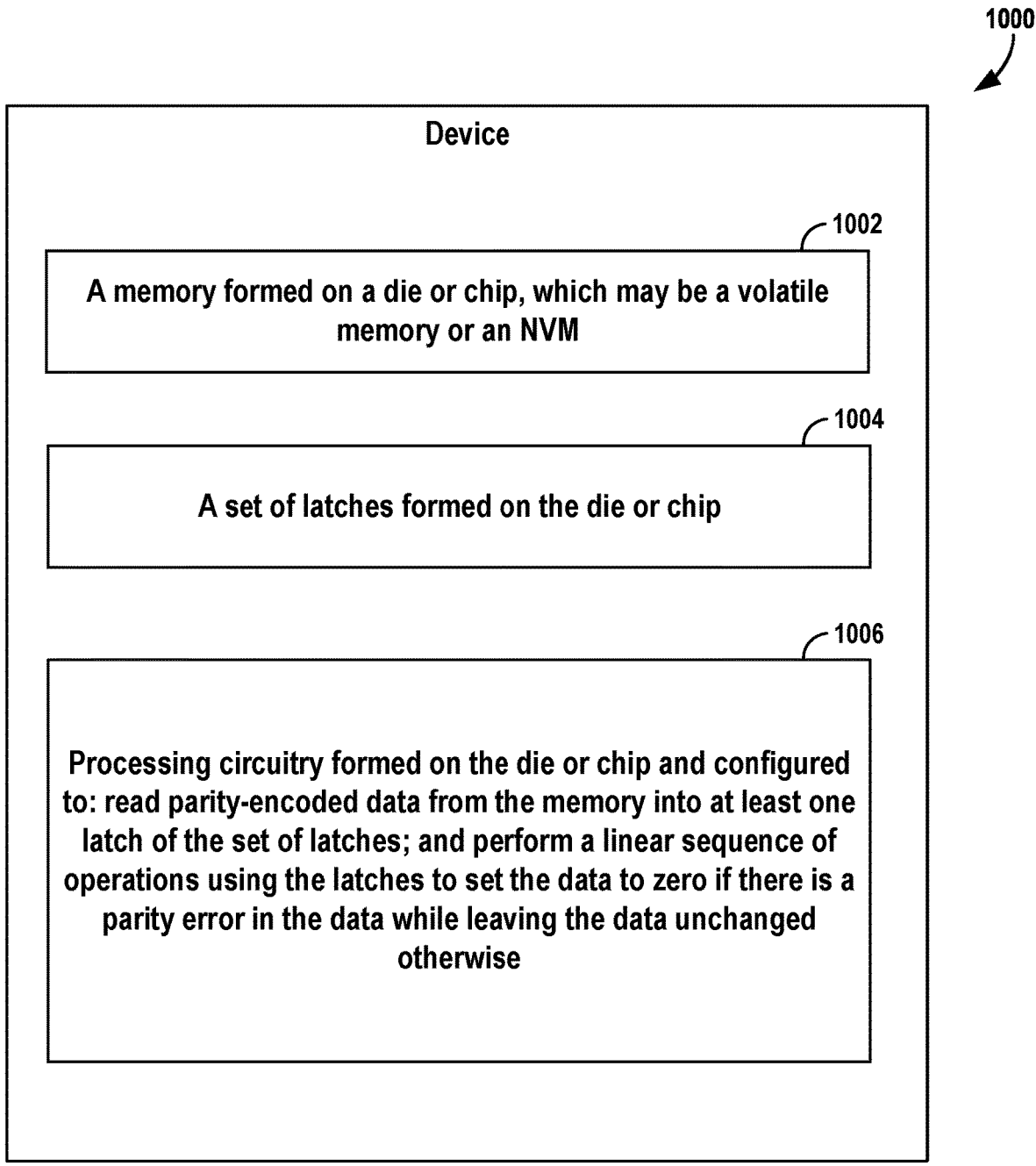
FIG. 10 is a block diagram illustrating another exemplary device according to aspects of the present disclosure.

FIG. 10 is a block diagram of a device 1000 that includes a memory 1002 formed on a die and a set of latches 1004 formed on the die. The memory may be a volatile memory or an NVM. The device 1000 (which may be a data storage device) also includes a processing circuit or processing circuitry 1006 formed on the die and configured to: read parity-encoded data from the memory into at least one latch of the set of latches; and perform a linear sequence of operations using the set of latches to set the data to zero if there is a parity error in the data while leaving the data unchanged otherwise. The memory may be an NVM or a volatile memory. The data may be neural network weights or data representing some other type of information.

Figure 11:
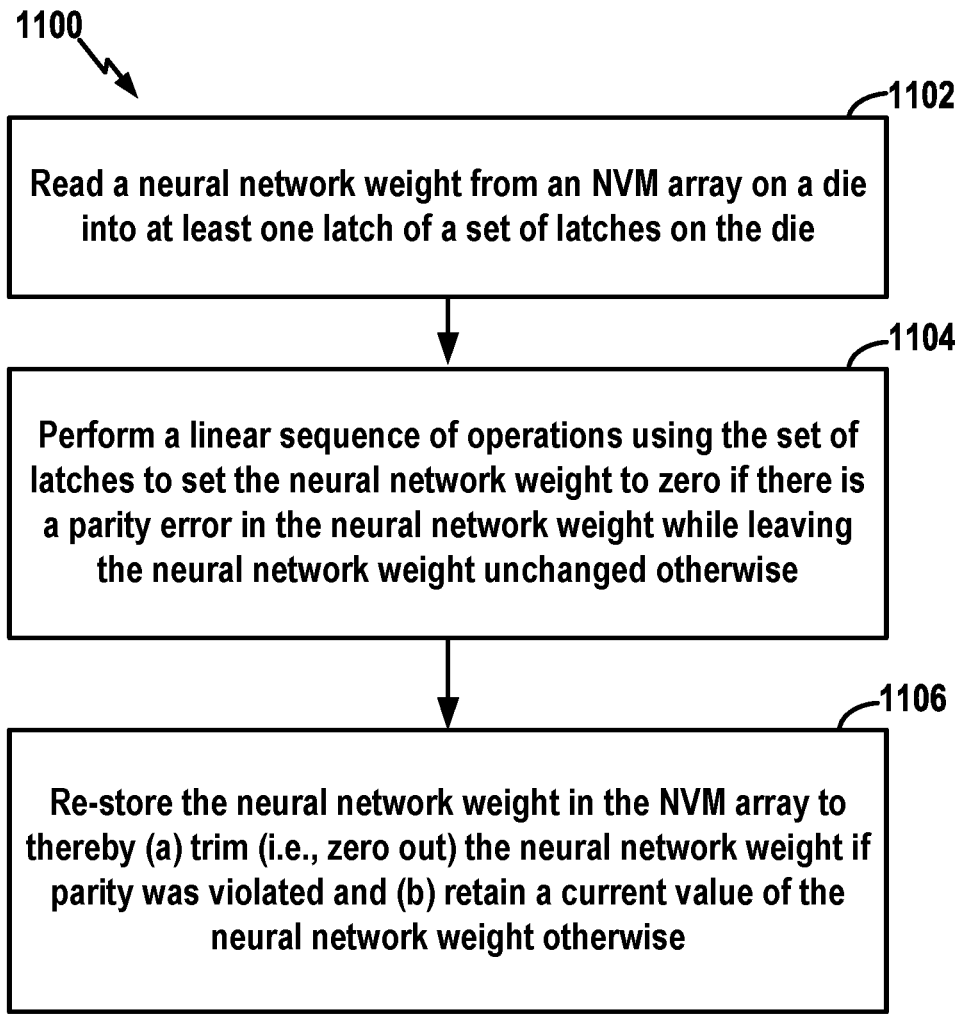
FIG. 11 is a flow chart of an exemplary method according to aspects of the present disclosure.

FIG. 11 illustrates a method or process 1100 in accordance with some aspects of the disclosure. The process 1100 may take place within any suitable device (which may be a data storage device) or apparatus capable of performing the operations, such as a NAND die configured with latches and appropriate processing circuitry. See, for example, the devices of FIGS. 2, 12, and 13, described above. At block 1102, the device reads a neural network weight from the NVM array into at least one latch of a set of latches on the die. At block 1104, the device performs a linear sequence of operations using the set of latches to set the neural network weight to zero if there is a parity error in the neural network weight while leaving the neural network weight unchanged otherwise. At block 1106, the device re-stores the neural network weight in the NVM array to thereby (a) trim (i.e., zero out) the neural network weight if parity was violated and (b) retain a current value of the neural network weight otherwise. See, for example, the method of FIG. 10, described above.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. See, also, 3D XPoint (3DXP)) memories. Each type of memory device may have different configurations. For example, flash memory devices may be configured in a NAND or a NOR configuration.

Regarding the application of the features described herein to other memories besides NAND: NOR, 3DXP, PCM, and ReRAM have page-based architectures and programming processes that usually require operations such as shifts, XORs, ANDs, etc. If such devices do not already have latches (or their equivalents), latches can be added to support the latch-based operations described herein. Note also that latches can have a small footprint relative to the size of a memory array as one latch can connect to many thousands of cells, and hence adding latches does not typically require much circuit space.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the z direction) with each column having multiple memory elements in each column. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-y) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A device, comprising:
a non-volatile memory (NVM) array formed on a die;
a plurality of latches formed on the die; and
processing circuitry formed on the die and configured to:
read a neural network weight from the NVM array into at least one latch of the plurality of latches, and
perform a linear sequence of latch operations using the plurality of latches to set the neural network weight to zero if there is a parity error in the neural network weight while leaving the neural network weight unchanged otherwise, wherein the linear sequence of latch operations corresponds to a single processing flow.

2. The device of claim 1, wherein the processing circuitry is further configured to re-store the neural network weight in the NVM array.

3. The device of claim 1, wherein the processing circuitry is further configured to perform a machine learning operation using the neural network weight as a floating-point number.

4. The device of claim 1, wherein the neural network weight is represented as a parity-encoded binary sequence.

5. The device of claim 4, wherein the processing circuitry is configured to perform the linear sequence of operations by being further configured to:
perform a first series of linear operations using one or more latches of the plurality of latches to reduce the neural network weight down to a single bit within one of the latches, where the single bit is representative of the parity of the neural network weight;
perform a second series of linear operations to propagate the parity bit into the one or more of the other latches to yield a binary sequence within one of the latches, which, when combined with the neural network weight, results in (a) the neural network weight if parity was not violated and results in (b) binary zeroes if parity was violated; and combine the binary sequence with the neural network weight.

6. The device of claim 1, wherein the processing circuitry is further configured to determine an amount of degradation in the NVM array.

7. The device of claim 6, wherein the processing circuitry is further configured to perform at least one operation to mitigate the degradation.

8. The device of claim 7, wherein the processing circuitry is configured to mitigate the degradation by performing one of more of: (a) re-generating the plurality of neural network weights; (b) re-storing the plurality of neural network weights in the NVM array; and (c) performing one or more NVM maintenance operations.

9. The device of claim 1, wherein the NVM array comprises a plurality of planes, and wherein the processing circuitry is further configured to concurrently perform the linear sequence of operations for a plurality of neural network weights in parallel, wherein the plurality of neural network weights are obtained from the plurality of planes.

10. A multiple die apparatus comprising a plurality of the devices of claim 1, wherein the multiple die apparatus is configured to concurrently perform the linear sequence of operations for a plurality of neural network weights in parallel on a plurality of dies.

11. A method for use with a device comprising a non-volatile memory (NVM) array comprising a plurality of planes formed on a die, the method comprising:

reading a neural network weight from the NVM array into at least one latch of a plurality of latches on the die; and performing a linear sequence of latch operations using the plurality of latches to set the neural network weight to zero if there is a parity error in the neural network weight while leaving the neural network weight unchanged otherwise, wherein the linear sequence of latch operations corresponds to a single processing flow.

12. The method of claim 11, further comprising re-storing the neural network weight in the NVM array.

13. The method of claim 11, wherein the neural network weight is a parity-encoded binary sequence.

14. The method of claim 13, wherein performing the linear sequence of operations comprises:

performing a first series of linear operations using one or more latches of the plurality of latches to reduce the neural network weight down to a single bit within one of the latches, where the single bit is representative of the parity of the neural network weight;

performing a second series of linear operations to propagate the parity bit into the one or more of the other latches so as to yield a binary sequence within one of the latches, which, when combined with the neural network weight, results in (a) the neural network weight if parity was not violated and results in (b) binary zeroes if parity was violated; and combining the binary sequence with the neural network weight.

15. The method of claim 11, further comprising determining an amount of degradation in the NVM array.

16. The method of claim 15, further comprising performing at least one operation to mitigate the degradation.

17. The method of claim 16, further comprising mitigating the degradation by performing one or more of: (a) re-generating the plurality of neural network weights; (b) re-storing the plurality of neural network weights in the NVM array; and (c) performing one or more NVM maintenance operations.

18. A device, comprising:

a memory formed on a die;

a plurality of latches formed on the die; and processing circuitry formed on the die and configured to:

read parity-encoded data from the memory into at least one latch of the plurality of latches, and perform a linear sequence of latch operations using the plurality of latches to set the data to zero if there is a parity error in the data while leaving the data unchanged otherwise, wherein the linear sequence of latch operations corresponds to a single processing flow.

19. The device of claim 18, wherein the processing circuitry is configured to perform the linear sequence of operations by being further configured to:

perform a first series of linear operations using one or more latches of the plurality of latches to reduce the data down to a single bit within one of the latches, where the single bit is representative of the parity of the data;

perform a second series of linear operations to propagate the parity bit into the one or more of the other latches so as to yield a binary sequence within one of the latches, which, when combined with the data, results in (a) the data if parity was not violated and results in (b) binary zeroes if parity was violated; and combine the binary sequence with the data.

20. The device of claim 18, wherein the processing circuitry is further configured to determine an amount of degradation in the memory.

21. An apparatus for use with a device comprising a non-volatile memory (NVM) array formed on a die, the apparatus comprising:

means for reading a neural network weight from the NVM array into at least one latch of a plurality of latches on the die; and means for performing a linear sequence of latch operations using the plurality of latches to set the neural network weight to zero if there is a parity error in the neural network weight while leaving the neural network weight unchanged otherwise, wherein the linear sequence of latch operations corresponds to a single processing flow.

22. The device of claim 1, wherein the processing circuitry is further configured to perform the latch operations by being further configured to perform latch operations comprising one or more of: a LOAD operation, an OR operation, a XOR operation, an AND operation, a LEFT SHIFT operation, a RIGHT SHIFT operation, and a COPY operation.

23. The method of claim 11, wherein the performing the latch operations comprises performing one or more of: a LOAD operation, an OR operation, a XOR operation, an AND operation, a LEFT SHIFT operation, a RIGHT SHIFT operation, and a COPY operation.

24. The device of claim 18, wherein the processing circuitry is further configured to perform the latch operations by being further configured to perform latch operations comprising one or more of: a LOAD operation, an OR operation, a XOR operation, an AND operation, a LEFT SHIFT operation, a RIGHT SHIFT operation, and a COPY operation.

25. A device, comprising:
- a non-volatile memory (NVM) array formed on a die, wherein the NVM array comprises a plurality of planes;
- a plurality of latches formed on the die; and
- processing circuitry formed on the die and configured to:
    - read a neural network weight from the NVM array into at least one latch of the plurality of latches, and
    - perform a linear sequence of operations using the plurality of latches to set the neural network weight to zero if there is a parity error in the neural network weight while leaving the neural network weight unchanged otherwise; and
    - wherein the processing circuitry is further configured to concurrently perform the linear sequence of operations for a plurality of the neural network weights in parallel, wherein the plurality of neural network weights are obtained from the plurality of planes.

26. A method for use with a device comprising a non-volatile memory (NVM) array including a plurality of planes formed on a die, the method comprising:
- reading a neural network weight from the NVM array into at least one latch of a plurality of latches on the die; and
- performing a linear sequence of operations using the plurality of latches to set the neural network weight to zero if there is a parity error in the neural network weight while leaving the neural network weight unchanged otherwise; and
- wherein performing the linear sequence of operations comprises concurrently performing the linear sequence of operations for a plurality of the neural network weights in parallel, wherein the plurality of neural network weights are obtained from the plurality of planes.

27. A multiple die apparatus comprising a plurality of devices, each device comprising:
- a non-volatile memory (NVM) array formed on a die;
- a plurality of latches formed on the die; and
- processing circuitry formed on the die and configured to:
    - read a neural network weight from the NVM array into at least one latch of the plurality of latches, and
    - perform a linear sequence of operations using the plurality of latches to set the neural network weight to zero if there is a parity error in the neural network weight while leaving the neural network weight unchanged otherwise; and
    - wherein the multiple die apparatus is configured to concurrently perform the linear sequence of operations for a plurality of the neural network weights in parallel on a plurality of the dies.

28. A method for use with a multiple die apparatus comprising a plurality of devices, each including a non-volatile memory (NVM) array formed on a die, the method comprising:
- for each die of the plurality of devices,
    - reading a neural network weight from the NVM array of the die into at least one latch of a plurality of latches on the die; and
    - performing a linear sequence of operations using the plurality of latches of the die to set the neural network weight to zero if there is a parity error in the neural network weight while leaving the neural network weight unchanged otherwise; and
    - wherein the multiple die apparatus concurrently performs the linear sequence of operations for a plurality of the neural network weights in parallel on the plurality of dies.

* * * * *